US012726979B2

(12) United States Patent
Maamari et al.

(10) Patent No.: US 12,726,979 B2
(45) Date of Patent: Sep. 1, 2026

(54) UPLINK TRANSMIT OCCASION UPLINK CONTROL INFORMATION FOR A CELL DISCONTINUOUS COMMUNICATION CYCLE

(71) Applicant: QUALCOMM Incorporated, San Diego, CA (US)

(72) Inventors: Diana Maamari, San Diego, CA (US); Ahmed Attia Abotabl, San Diego, CA (US); Huilin Xu, Temecula, CA (US)

(73) Assignee: QUALCOMM Incorporated, San Diego, CA (US)

(*) Notice: Subject to any disclaimer, the term of this patent is extended or adjusted under 35 U.S.C. 154(b) by 237 days.

(21) Appl. No.: 18/523,443

(22) Filed: Nov. 29, 2023

(65) Prior Publication Data

US 2025/0175976 A1 May 29, 2025

(51) Int. Cl.

*H04W 72/21* (2023.01)
*H04W 72/0446* (2023.01)
*H04W 72/1268* (2023.01)
*H04W 76/28* (2018.01)

(52) U.S. Cl.

CPC ... *H04W 72/1268* (2013.01); *H04W 72/0446* (2013.01); *H04W 72/21* (2023.01); *H04W 76/28* (2018.02)

(58) Field of Classification Search

CPC ......... H04W 72/0446; H04W 72/1268; H04W 72/21; H04W 72/23; H04W 76/28

USPC .......................................................... 370/329

See application file for complete search history.

(56) References Cited

U.S. PATENT DOCUMENTS

| | | | | |
|---|---|---|---|---|
| 2021/0298065 A1* | 9/2021 | Awoniyi-Oteri | ...... | H04W 72/23 |
| 2022/0095360 A1* | 3/2022 | Kim | ...... | H04W 72/23 |
| 2024/0260073 A1* | 8/2024 | Xu | ...... | H04W 72/20 |
| 2024/0276514 A1* | 8/2024 | Fan | ...... | H04W 48/16 |
| 2024/0357599 A1* | 10/2024 | Park | ...... | H04W 72/0446 |
| 2025/0274939 A1* | 8/2025 | Lee | ...... | H04W 72/115 |
| 2025/0331059 A1* | 10/2025 | Xu | ...... | H04L 1/1896 |

* cited by examiner

*Primary Examiner* — Robert J Lopata

(74) *Attorney, Agent, or Firm* — Holland & Hart LLP

(57) ABSTRACT

Methods, systems, and devices for wireless communications are described. A user equipment (UE) may transmit an uplink control information (UCI) indicating whether configured grant (CG) physical uplink shared channel (PUSCH) (CG-PUSCH) transmit occasions overlapping with active durations of a DRX configuration are unused by the UE. The UE may receive first control information including a cell discontinuous reception (DRX) configuration of a serving cell of the UE. The DRX configuration may indicate a periodic active duration of serving cell reception and periodic inactive duration of the serving cell reception. The UE may receive second control information including a CG configuration indicating CG-PUSCH transmit occasions. The UE may transmit, during a CG-PUSCH transmit occasion, the UCI indicating whether each of a quantity of subsequent CG-PUSCH transmit occasions of the CG-PUSCH transmit occasions that overlap with one or more periods of the periodic active duration are unused by the UE.

34 Claims, 17 Drawing Sheets

Receive first control information including a cell DRX configuration of a serving cell of the UE, the cell DRX configuration indicating a periodic active duration of serving cell reception and a periodic inactive duration of the serving cell reception

1505

Receive second control information including a CG configuration that indicates CG-PUSCH transmit occasions

1510

Transmit, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE, wherein the UCI indicates whether subsequent valid CG-PUSCH transmit occasions are unused by the UE and skips indicating whether subsequent invalid CG-PUSCH transmit occasions are unused by the UE, wherein a valid CG-PUSCH transmit occasion at least partially overlaps with the periodic active duration, wherein an invalid CG-PUSCH transmit occasion is within the periodic inactive duration, and wherein the quantity of subsequent CG-PUSCH transmit occasions are valid CG-PUSCH transmit occasions

1515

1500

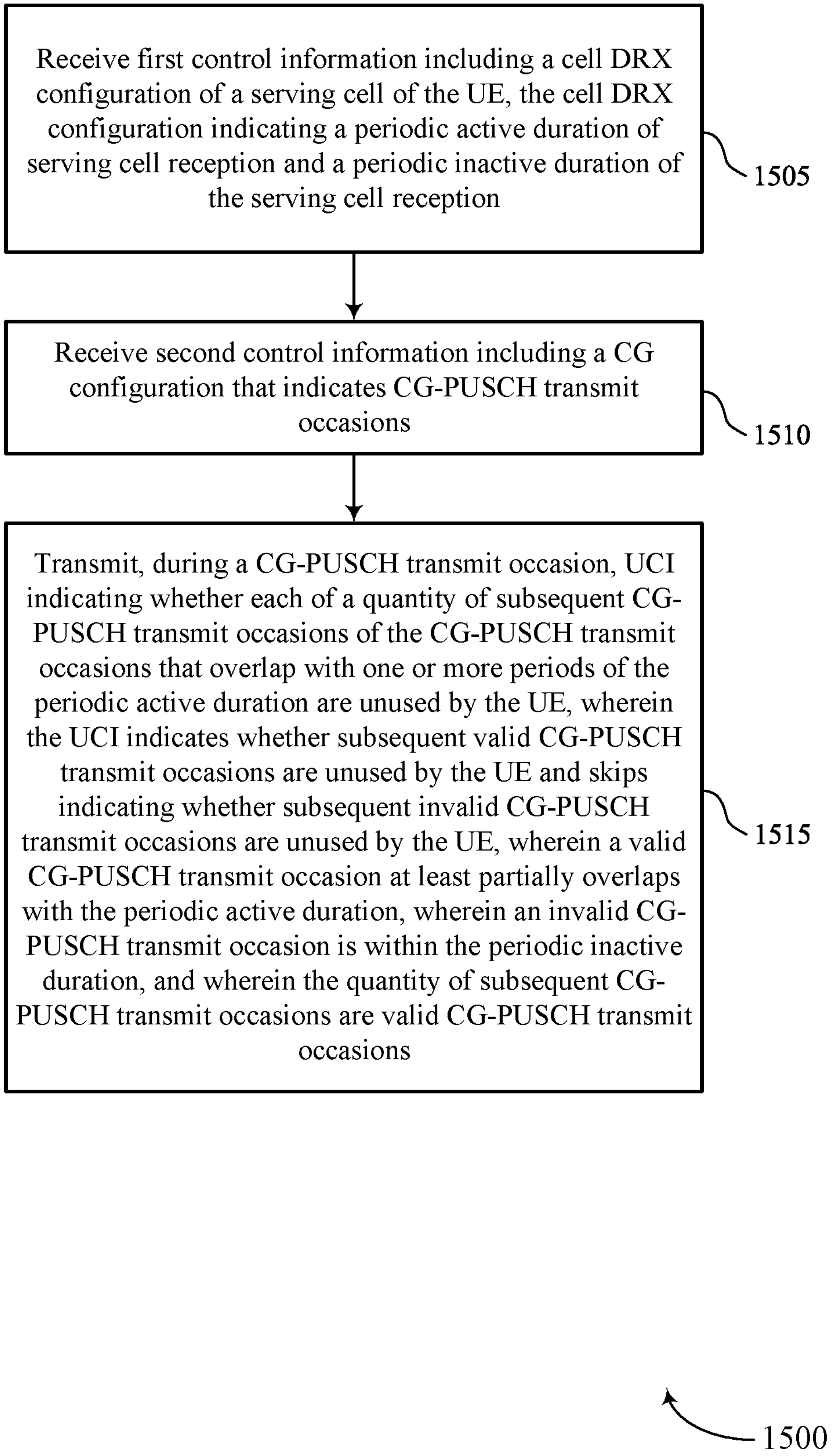

FIG. 15

UPLINK TRANSMIT OCCASION UPLINK CONTROL INFORMATION FOR A CELL DISCONTINUOUS COMMUNICATION CYCLE

FIELD OF TECHNOLOGY

The following relates to wireless communications, including uplink transmit occasion uplink control information (UCI) for a cell discontinuous communication cycle.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support uplink transmit occasion uplink control information (UCI) for a cell discontinuous communication cycle. For example, the described techniques provide for a user equipment (UE) to transmit a UCI indicating whether configured grant (CG) physical uplink shared channel (PUSCH) (CG-PUSCH) transmit occasions that overlap with a cell discontinuous reception (DRX) active duration are unused by the UE while skipping indicating whether CG-PUSCH transmit occasions that overlap with (e.g., are within) a cell DRX inactive duration. For instance, a network entity may indicate, to the UE, a cell DRX configuration of a serving cell of the UE. The DRX configuration may indicate a periodic active duration of serving cell reception and periodic inactive duration of the serving cell reception. The network entity may also indicate, to the UE, a CG configuration indicating CG-PUSCH transmit occasions. For example, the CG configuration may indicate a periodic set of CG-PUSCH transmit occasions via which the UE may transmit uplink messages to the network entity. During a CG-PUSCH occasion, the UE may transmit UCI indicating whether each of a quantity of subsequent CG-PUSCH transmit occasions that overlap with one or more periods of the periodic active duration (e.g., valid PUSCH transmit occasions) are unused by the UE. The UCI may skip (e.g., exclude) indicating whether subsequent CG-PUSCH transmit occasions that are within (e.g., overlap with) one or more periods of the periodic inactive duration (e.g., invalid PUSCH transmit occasions) are unused by the UE.

A method for wireless communications by a UE is described. The method may include receiving first control information including a cell DRX configuration of a serving cell of the UE, the cell DRX configuration indicating a periodic active duration of serving cell reception and a periodic inactive duration of the serving cell reception, receiving second control information including a CG configuration that indicates CG-PUSCH transmit occasions, and transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

An apparatus for wireless communications at a UE is described. The apparatus may include one or more processors, and instructions stored in one or more memories and executable by the one or more processors, individually or collectively, to cause the apparatus to receive first control information including a cell DRX configuration of a serving cell of the UE, the cell DRX configuration indicating a periodic active duration of serving cell reception and a periodic inactive duration of the serving cell reception, receive second control information including a CG configuration that indicates CG-PUSCH transmit occasions, and transmit, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

Another apparatus for wireless communications at a UE is described. The apparatus may include means for receiving first control information including a cell DRX configuration of a serving cell of the UE, the cell DRX configuration indicating a periodic active duration of serving cell reception and a periodic inactive duration of the serving cell reception, means for receiving second control information including a CG configuration that indicates CG-PUSCH transmit occasions, and means for transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

A non-transitory computer-readable medium storing code for wireless communications at a UE is described. The code may include instructions executable by a processor to receive first control information including a cell DRX configuration of a serving cell of the UE, the cell DRX configuration indicating a periodic active duration of serving cell reception and a periodic inactive duration of the serving cell reception, receive second control information including a CG configuration that indicates CG-PUSCH transmit occasions, and transmit, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

Some examples of the method, UEs, and non-transitory computer-readable medium described herein may further include operations, features, means, or instructions for transmitting, during one of the quantity of subsequent CG-PUSCH transmit occasions used by the UE, one or more uplink messages in accordance with the UCI.

In some examples of the method, UEs, and non-transitory computer-readable medium described herein, the UCI indicates whether subsequent valid CG-PUSCH transmit occasions may be unused by the UE and skips indicating whether subsequent invalid CG-PUSCH transmit occasions may be unused by the UE, a valid CG-PUSCH transmit occasion at least partially overlaps with the periodic active duration, an invalid CG-PUSCH transmit occasion may be within the periodic inactive duration, and the quantity of subsequent CG-PUSCH transmit occasions may be valid CG-PUSCH transmit occasions.

In some examples of the method, UEs, and non-transitory computer-readable medium described herein, the UCI skips indicating whether each of a second quantity of subsequent CG-PUSCH transmit occasions that may be within the periodic inactive duration may be unused by the UE.

In some examples of the method, UEs, and non-transitory computer-readable medium described herein, the quantity of subsequent CG-PUSCH transmit occasions overlap with multiple periods of the periodic active duration.

Some examples of the method, UEs, and non-transitory computer-readable medium described herein may further include operations, features, means, or instructions for receiving third control information that extends an active duration for a period of the periodic active duration, where one or more of the subsequent CG-PUSCH transmit occasions indicated by the UCI overlap with a portion of the active duration extended by the third control information.

In some examples of the method, UEs, and non-transitory computer-readable medium described herein, a quantity of bits of the UCI may be increased relative to a configured window size associated with the UCI based on the third control information extending the active duration for the period of the periodic active duration.

Some examples of the method, UEs, and non-transitory computer-readable medium described herein may further include operations, features, means, or instructions for receiving third control information activating the cell DRX configuration of the serving cell, where one or more CG-PUSCH transmit occasions that may be subsequent to the CG-PUSCH transmit occasion may be excluded from the subsequent CG-PUSCH transmit occasions indicated by the UCI based on the one or more CG-PUSCH transmit occasions being within the periodic inactive duration of the activated cell DRX configuration.

Some examples of the method, UEs, and non-transitory computer-readable medium described herein may further include operations, features, means, or instructions for receiving third control information indicating a window size of the UCI, where the window size may be applicable to CG-PUSCH transmit occasions that overlap with the periodic active duration and may be inapplicable to CG-PUSCH transmit occasions that may be within the periodic inactive duration.

In some examples of the method, UEs, and non-transitory computer-readable medium described herein, the subsequent CG-PUSCH transmit occasions include one or more non-consecutive CG-PUSCH transmit occasions in a time domain.

In some examples of the method, UEs, and non-transitory computer-readable medium described herein, the subsequent CG-PUSCH transmit occasions may be consecutive in the time domain with respect to one or more periods of the periodic active duration.

In some examples of the method, UEs, and non-transitory computer-readable medium described herein, one or more of the CG-PUSCH transmit occasions overlap with the periodic inactive duration.

A method for wireless communications by a network entity is described. The method may include transmitting first control information including a cell DRX configuration of a serving cell of a UE, the cell DRX configuration indicating a periodic active duration of serving cell reception and a periodic inactive duration of serving cell reception, transmitting second control information including a CG configuration that indicates CG-PUSCH transmit occasions, and receiving, during a CG-PUSCH transmit occasion, UCI indicating whether each of a quantity of subsequent CG-PUSCH transmit occasions that overlap with one or more periods of the periodic active duration are unused by the UE.

An apparatus for wireless communications at a network entity is described. The apparatus may include one or more processors, and instructions stored in one or more memories and executable by the one or more processors, individually or collectively, to cause the apparatus to transmit first control information including a cell DRX configuration of a serving cell of a UE, the cell DRX configuration indicating a periodic active duration of serving cell reception and a periodic inactive duration of serving cell reception, transmit second control information including a CG configuration that indicates CG-PUSCH transmit occasions, and receive, during a CG-PUSCH transmit occasion, UCI indicating whether each of a quantity of subsequent CG-PUSCH transmit occasions that overlap with one or more periods of the periodic active duration are unused by the UE.

Another apparatus for wireless communications at a network entity is described. The apparatus may include means for transmitting first control information including a cell DRX configuration of a serving cell of a UE, the cell DRX configuration indicating a periodic active duration of serving cell reception and a periodic inactive duration of serving cell reception, means for transmitting second control information including a CG configuration that indicates CG-PUSCH transmit occasions, and means for receiving, during a CG-PUSCH transmit occasion, UCI indicating whether each of a quantity of subsequent CG-PUSCH transmit occasions that overlap with one or more periods of the periodic active duration are unused by the UE.

A non-transitory computer-readable medium storing code for wireless communications at a network entity is described. The code may include instructions executable by a processor to transmit first control information including a cell DRX configuration of a serving cell of a UE, the cell DRX configuration indicating a periodic active duration of serving cell reception and a periodic inactive duration of serving cell reception, transmit second control information including a CG configuration that indicates CG-PUSCH transmit occasions, and receive, during a CG-PUSCH transmit occasion, UCI indicating whether each of a quantity of subsequent CG-PUSCH transmit occasions that overlap with one or more periods of the periodic active duration are unused by the UE.

Some examples of the method, network entities, and non-transitory computer-readable medium described herein may further include operations, features, means, or instructions for receiving, during one of the quantity of subsequent CG-PUSCH transmit occasions used by the UE, one or more uplink messages in accordance with the UCI.

In some examples of the method, network entities, and non-transitory computer-readable medium described herein, the UCI indicates whether subsequent valid CG-PUSCH transmit occasions may be used by the UE and skips indicating whether subsequent invalid CG-PUSCH transmit occasions may be unused by the UE, a valid CG-PUSCH transmit occasion at least partially overlaps with the periodic active duration, an invalid CG-PUSCH transmit occasion may be within the periodic inactive duration, and the quantity of subsequent CG-PUSCH transmit occasions may be valid CG-PUSCH transmit occasions.

In some examples of the method, network entities, and non-transitory computer-readable medium described herein, the UCI skips indicating whether each of a second quantity of subsequent CG-PUSCH transmit occasions that may be within the periodic inactive duration may be unused by the UE.

In some examples of the method, network entities, and non-transitory computer-readable medium described herein, the quantity of subsequent CG-PUSCH transmit occasions overlap with multiple periods of the periodic active duration.

Some examples of the method, network entities, and non-transitory computer-readable medium described herein may further include operations, features, means, or instructions for transmitting third control information that extends an active duration for a period of the periodic active duration, where one or more of the subsequent CG-PUSCH transmit occasions indicated by the UCI overlap with a portion of the active duration extended by the third control information.

In some examples of the method, network entities, and non-transitory computer-readable medium described herein, the third control information indicates that a quantity of bits associated with a second UCI may be greater than a quantity of bits associated with the UCI based in accordance with the third control information extending the active duration for the period of the periodic active duration.

Some examples of the method, network entities, and non-transitory computer-readable medium described herein may further include operations, features, means, or instructions for transmitting third control information activating the cell DRX configuration of the serving cell, where one or more CG-PUSCH transmit occasions that may be subsequent to the CG-PUSCH transmit occasion may be excluded from the subsequent CG-PUSCH transmit occasions indicated by the UCI based on the one or more CG-PUSCH transmit occasions being within the periodic inactive duration of the activated cell DRX configuration.

Some examples of the method, network entities, and non-transitory computer-readable medium described herein may further include operations, features, means, or instructions for transmitting third control information indicating a window size of the UCI, where the window size may be applicable to CG-PUSCH transmit occasions that overlap with the periodic active duration and may be inapplicable to CG-PUSCH transmit occasions that may be within the periodic inactive duration.

In some examples of the method, network entities, and non-transitory computer-readable medium described herein, the subsequent CG-PUSCH transmit occasions include one or more non-consecutive CG-PUSCH transmit occasions in a time domain.

In some examples of the method, network entities, and non-transitory computer-readable medium described herein, the subsequent CG-PUSCH transmit occasions may be consecutive in the time domain with respect to one or more periods of the periodic active duration.

In some examples of the method, network entities, and non-transitory computer-readable medium described herein, one or more of the CG-PUSCH transmit occasions overlap with the periodic inactive duration.

BRIEF DESCRIPTION OF THE DRAWINGS

FIGS. 13 through 17 show flowcharts illustrating methods that support uplink transmit occasion UCI for a cell discontinuous communication cycle in accordance with one or more aspects of the present disclosure.

DETAILED DESCRIPTION

Figure 1:
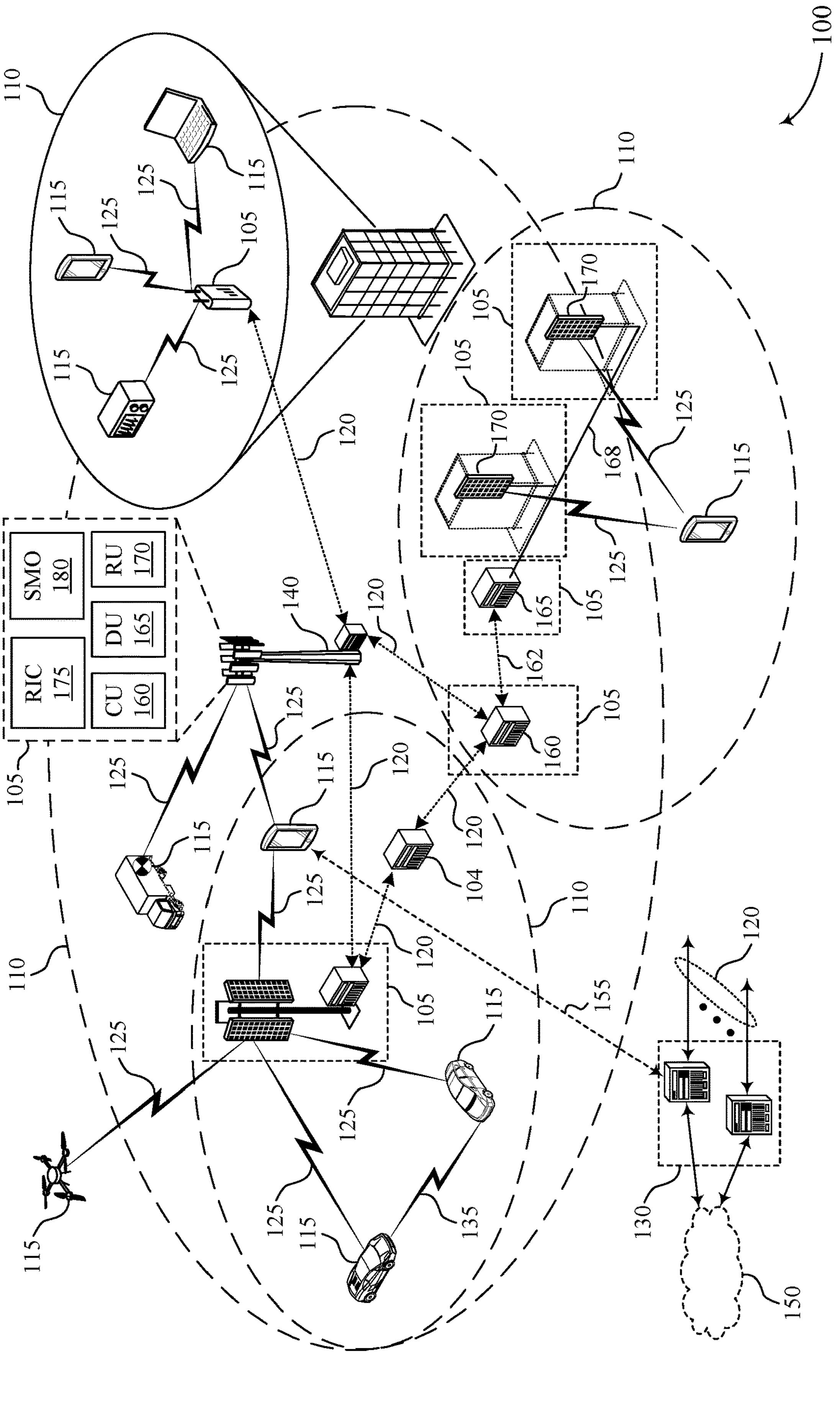
FIG. 1 shows an example of a wireless communications system that supports uplink transmit occasion uplink control information (UCI) for a cell discontinuous communication cycle in accordance with one or more aspects of the present disclosure.

Some cells of a wireless communications system may operate according to a cell discontinuous transmission (DTX) configuration or discontinuous reception (DRX) configuration. A network entity associated with (e.g., that serves) such a cell may operate in accordance with periodic communication cycles including an active period, during which the network entity may communicate with one or more user equipments (UEs) of the cell, and an inactive period, during which the network entity may conserve power by refraining from communicating (e.g., entering into a power saving state, powering down one or more components of the network entity). In this way, the inactive periods may support network energy savings (NES).

In some examples, a UE may be configured with configured grant (CG) uplink transmit occasions, such as CG-physical uplink shared channel (PUSCH) (CG-PUSCH) transmit occasions, during which the UE may transmit uplink messages to a network entity. Additionally, the UE may be configured to indicate, via uplink control information (UCI), whether a set of subsequent CG-PUSCH transmit occasions are unused by the UE. For example, the UE, in a first CG-PUSCH occasion, may indicate via UCI (e.g., unused transmit occasion (UTO)-UCI, a UCI skipping indication) that the UE will skip using or will use each of the next set of (e.g., three, four, six, or some other quantity) CG-PUSCH occasions. In some cases, however, one or more CG-PUSCH transmit occasions may overlap with (e.g., occur during, be within) the inactive duration of a cell DRX cycle. But indicating whether the UE will or will not use CG-PUSCH transmit occasions that occur during inactive periods may be redundant, as the UE will not communicate messages via these CG-PUSCH transmit occasions (e.g., the UE is expected to drop these CG-PUSCH transmit occasions). That is, providing an indication that the UE is to skip these CG-PUSCH transmit occasions is redundant and thus a waste of resources.

In accordance with examples described herein, the UE may transmit a UTO-UCI that indicates whether the UE is expected to use or not use a next set of valid CG-PUSCH occasions. Valid CG-PUSCH occasions may refer to occasions that are during (e.g., at least partially overlapping with) an active period of the cell DRX configuration. Invalid CG-PUSCH occasions—CG-PUSCH occasions that occur during the inactive duration of the cell DRX configuration—are skipped by the UTO-UCI. For example, the CG-PUSCH occasions during inactive periods are automatically considered as dropped and, thus, are not indicated in the UTO-UCI. That is, the UTO-UCI is applicable to the valid CG-PUSCH occasions and is inapplicable to the invalid CG-PUSCH occasions. As such, the UTO-UCI may indicate CG-PUSCH occasions as used or unused over multiple cycles of the cell DRX active duration.

By indicating whether CG-PUSCH transmit occasions will be unused by the UE, resource usage efficiency may increase, coordination between the network entity and the UE may improve, and traffic latency may be reduced. For example, by indicating, via UTO-UCI, that one or more subsequent CG-PUSCH transmit occasions will be unused, a network entity may reallocate the unused resources for use by other devices (e.g., other UEs, use by the network entity or another network entity), thereby avoiding resource waste and increasing resource usage efficiency and device coordination. In some examples, the reallocation of unused resources may be used by other devices to communicate messages earlier than otherwise would have been communicated, thereby reducing latency. Further, in some examples, by indicating, via UTO-UCI, whether valid CG-PUSCH transmit occasions and skipping indicating whether invalid CG-PUSCH transmit occasions are unused, resource waste associated with indicating whether CG-PUSCH transmit occasions that are already understood to be unused (e.g., invalid CG-PUSCH transmit occasions) may be avoided, thereby increasing resource usage efficiency, among other benefits.

Aspects of the disclosure are initially described in the context of wireless communications systems. Aspects of the disclosure are also described in the context of a communication diagram and a process flow. Aspects of the disclosure are further illustrated by and described with reference to apparatus diagrams, system diagrams, and flowcharts that relate to uplink transmit occasion UCI for a cell discontinuous communication cycle.

FIG. 1 shows an example of a wireless communications system 100 that supports uplink transmit occasion UCI for a cell discontinuous communication cycle in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-NB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support uplink transmit occasion UCI for a cell discontinuous communication cycle as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a network entity 105 may operate according to a cell DRX configuration that indicates active period of reception by the network entity 105 and inactive periods of reception by the network entity 105. For example, the network entity 105 may receive messages from UEs 115 in a serving cell associated with the network entity 105 (e.g., UEs 115 served by the network entity 105 via the cell) during the active periods and refrain from receiving messages (e.g., enter a power saving state, power down one or more communication components) during the inactive periods. The network entity 105 may indicate the cell DRX configuration to a UE 115 such that the UE 115 may transmit messages to the network entity 105 during the active periods and refrain from transmitting messages to the network entity 105 during the inactive periods. In other words, the UE 115 may communicate with the network entity in accordance with the indicated cell DRX configuration.

Additionally, the network entity 105 may indicate a CG configuration, such as a CG-PUSCH configuration, to the UE 115. The CG configuration may include a set of uplink transmit occasions (e.g., CG-PUSCH transmit occasions) during which the UE 115 may transmit uplink messages (e.g., PUSCH messages) to the network entity 105. The UE 115, based on receiving the CG configuration, may transmit UCI (e.g., UTO-UCI) (e.g., during each CG-PUSCH transmit occasion used by the UE 115) to the network entity 105 indicating whether the UE 115 is to use each of a set of subsequent uplink transmit occasions. In accordance with examples described herein, to increase resource usage efficiency, among other benefits, the UCI may indicate whether subsequent uplink transmit occasions which overlap with active periods of the cell DRX configuration (e.g., valid uplink transmit occasions) are unused by the UE while skipping indicating whether subsequent uplink transmit occasions that overlap with (e.g., are within) inactive periods of the cell DRX configuration.

Figure 2:
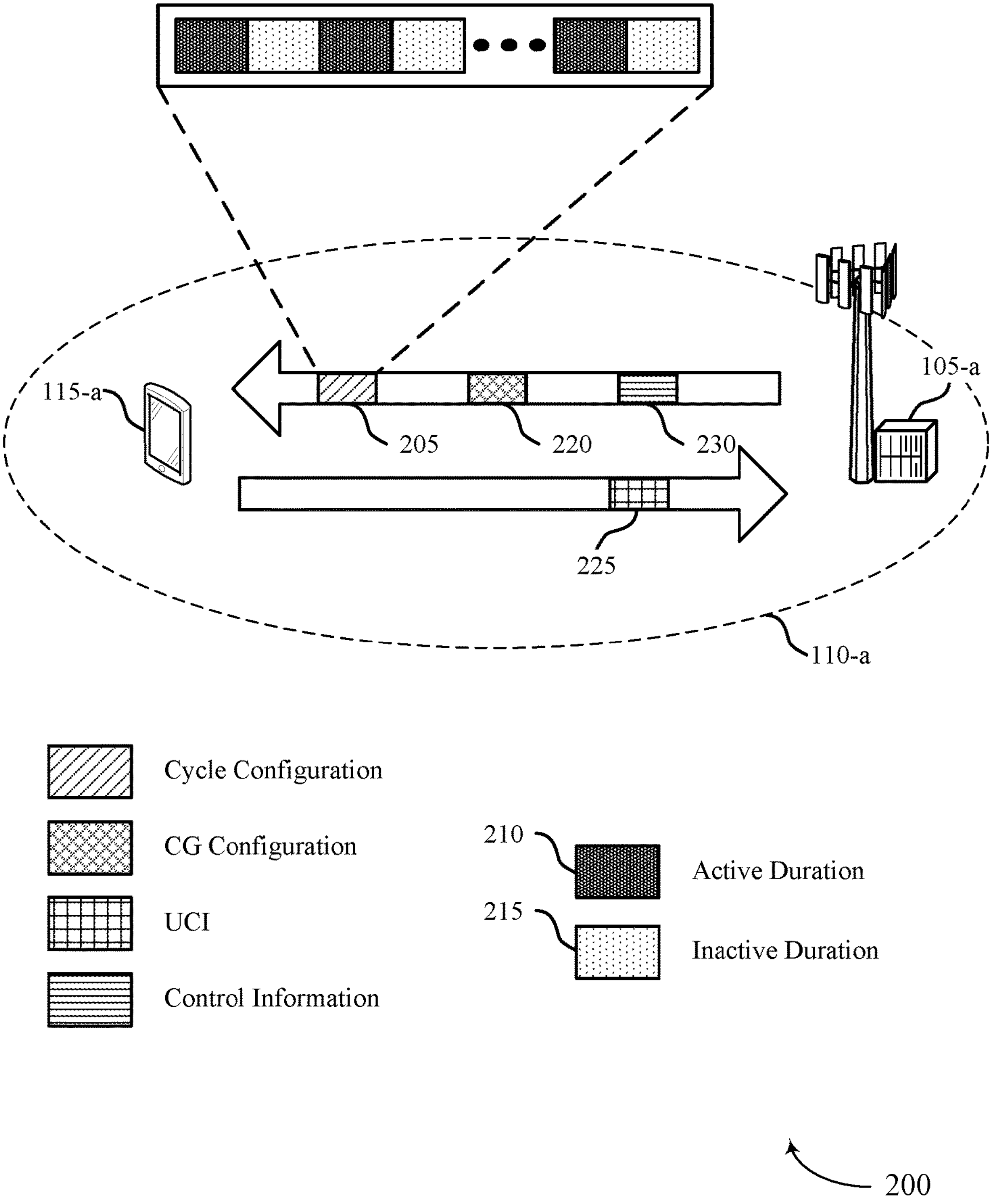
FIG. 2 shows an example of a wireless communications system that supports uplink transmit occasion UCI for a cell discontinuous communication cycle in accordance with one or more aspects of the present disclosure.

FIG. 2 shows an example of a wireless communications system 200 that supports uplink transmit occasion UCI for a cell discontinuous communication cycle in accordance with one or more aspects of the present disclosure. The wireless communications system 200 may implement or be implemented by various aspects of the wireless communications system 100. For example, the wireless communications system 200 may include a network entity 105-*a*, a coverage area 110-*a*, and a UE 115-*a*, which may represent examples of corresponding devices as described with reference to FIG. 1.

The network entity 105-*a* may serve UEs 115 of a serving cell associated with the coverage area 110. The network entity 105-*a* may operate according to a cell DRX configuration that indicates a periodic active duration 210 of serving cell reception (e.g., a periodic duration during which the network entity 105-*a* may receive messages via the serving cell) and indicates a periodic inactive duration 215 of serving cell reception. For example, the network entity 105-*a* may receive uplink messages from the UE 115-*a* during an active period of the cell DRX configuration and refrain from receiving uplink messages during an inactive period of the cell DRX configuration. The network entity 105-*a* may transmit control information to the UE 115-*a* that includes (e.g., indicates) the cell DRX configuration to the UE 115-*a*. For example, the control information may include a cycle configuration 205 to the UE 115-*a* that indicates the cell DRX configuration. The network entity 105-*a* may indicate the cell DRX configuration to the UE 115-*a* via the cycle configuration 205 such that the UE 115-*a* may transmit uplink messages to the network entity 105-*a* in accordance with the cell DRX configuration. In some examples, the network entity 105-*a* may transmit the cycle configuration 205 via downlink control information (DCI), a medium access control-control element (MAC-CE), radio resource control (RRC) signaling, or a combination thereof. In some examples, the cell DRX configuration may be indicated to the UE 115-*a* as an RRC configuration with layer 1 (L1)/layer 2 (L2) activation and deactivation.

Additionally, the network entity 105-*a* may transmit control information to indicate a CG configuration 220 to the UE 115-*a*. The CG configuration 220 may indicate uplink transmit occasions during which the UE 115-*a* may transmit uplink messages to the network entity 105-*a*. In some examples, the CG configuration 220 may indicate a periodic set of uplink transmit occasions via which the UE 115-*a* may transmit uplink messages to the network entity 105-*a*. For instance, each period of the set of uplink transmit occasions may contain a quantity of uplink transmit occasions, and each uplink transmit occasion may contain time and frequency resources (e.g., for a PUSCH), which the UE 115-*a* may use, for example, to transmit uplink information, such as XR data, among other types of traffic. The set of uplink transmit occasions may be, for example, CG-PUSCH transmit occasions (e.g., or CG-PUSCH occasions). For example, the UE 115-*a* may transmit, during one or more of the set of uplink transmit occasions, PUSCH messages. Additionally, or alternatively, the set of uplink transmit occasions may be referred to as CG uplink transmit occasions.

The UE 115-*a* may transmit UCI 225 to the network entity 105-*a* during an uplink transmit occasion indicated by the CG configuration 220. The UCI 225 may indicate whether the UE 115-*a* is to use (e.g., will use, is expected to use, uses) each of a set of subsequent uplink transmit occasions. For example, the UCI 225 may include a bitmap (e.g., a sequence of bits), where each bit of the bitmap corresponds to one of the set of subsequent uplink transmit occasions, and the value of each bit may indicate whether a corresponding uplink transmit occasion is used or unused by the UE 115-*a*. In some examples, the UCI 225 may be referred to as UTO-UCI or as a UCI skipping indication. In some examples, the UE 115-*a* may transmit UTO-UCI during each uplink transmit occasion used by the UE 115-*a* to indicate whether a respective set of subsequent uplink transmit occasions are unused by the UE 115-*a*.

In some cases, one or more of the set of uplink transmit occasions indicated by the CG configuration 220 may overlap with (e.g., be within, occur during, such as entirely during) an inactive duration 215 of the cell DRX configuration. The UE 115-*a* may be configured to drop uplink transmit occasions within inactive durations 215. In some cases, UTO-UCI may indicate whether a quantity of valid and consecutive CG-PUSCH transmit occasions (e.g., from the CG-PUSCH transmit occasion via which the UTO-UCI is transmitted) are used or unused, where a valid CG-PUSCH transmit occasion is an occasion that does not collide with downlink symbols from a TDD uplink-downlink configuration (e.g., tdd-UL-DL-ConfigurationCommon or tdd-UL-DL-ConfigurationDedicated) and that does not collide with synchronization signal blocks (SSBs). However, under such a definition of a valid CG-PUSCH transmit occasion, CG-PUSCH transmit occasions that are dropped by the UE 115-*a* due to being within an inactive duration 215 may still be indicated by UTO-UCI as being either used or unused by the UE 115-*a*.

In accordance with examples described herein, UCI 225 may indicate whether a quantity of valid consecutive uplink transmit occasions (e.g., CG-PUSCH transmit occasions) are used or unused, where a valid uplink transmit occasion is an occasion that overlaps (e.g., at least partially overlaps, fully overlaps) with an active duration 210 (e.g., in addition to being an uplink transmit occasion that does not collide with downlink symbols from a TDD uplink-downlink configuration for the UE 115-*a* and that does not collide with SSBs). For example, UCI 225 may exclude indicating whether uplink transmit occasions within an inactive duration 215 are unused by the UE 115-*a*. As such, the UE 115-*a* may (e.g., only) indicate whether uplink transmit occasions overlapping with active duration(s) 210 are used or unused by the UE 115-*a*, as indicating whether the UE 115-*a* is to use the uplink transmit occasions within the inactive durations 215 may be redundant and wasteful (e.g., because transmission to the network entity 105-*a* is unavailable during the inactive durations 215).

In some examples, the UCI 225 may indicate whether the UE 115-*a* is to use the uplink transmit occasions overlapping with the active duration 210 for multiple cycles of the cell DRX configuration. For example, the set of subsequent uplink transmit occasions may overlap with multiple periods of the active duration 210 (e.g., a first period of the active duration 210, a second period of the active duration 210, and so on).

In some examples, the UE 115-*a* may receive control information 230 from the network entity 105-*a* configuring a window size (e.g., "Nu") of the UCI 225. The window size may indicate a quantity of uplink transmit occasions indicated by the UE 115-*a*, via a given UCI 225, as used or unused. The window size, in some examples, may be shared between uplink transmit occasions over multiple active durations 210. For example, because the UCI 225 may skip indicating whether uplink transmit occasions within inactive durations 215 are used or unused, the quantity of uplink transmit occasions indicated by a given UCI 225 may span multiple periods of the active duration 210.

In some examples, the network entity 105-*a* may transmit control information 230 (e.g., DCI) to the UE 115-*a* that activates the cell DRX configuration of the network entity 105-*a* (e.g., indicated by the cycle configuration 205), extends one or more periods of the active duration 210, or both. For example, the DCI may be an example of a group DCI or common DCI transmitted to a group of UEs 115 (e.g., including the UE 115-*a*) in the serving cell to activate or deactivate the cell DRX configuration. The DCI may, in some aspects, dynamically activate or deactivate a cell DRX configuration, dynamically extend one or more periods of the active duration 210 of a cell DRX configuration, or both.

In some examples, the uplink transmit occasions indicated by the UCI 225 may be dynamically adjusted based on receiving the control information 230 deactivating the cell DRX configuration, activating the cell DRX configuration, and/or extending one or more periods of the active duration 210. For example, if the cell DRX configuration is deactivated, the network entity 105-*a* may be active during the inactive durations 215. As such, if the control information 230 deactivates the DRX configuration, one or more uplink transmit occasions, which were within an inactive duration 215 before the deactivation, may now overlap with active time of the network entity 105. Accordingly, the UCI 225 may indicate whether the one or more uplink transmit occasions (e.g., that are within a window size associated with the UCI 225) are unused by the UE 115-*a*. Similarly, if the control information 230 extends an active duration 210, the UCI 225 may indicate uplink transmit occasions that are within the extended portion of the active duration 210 as used or unused. Alternatively, if the cell DRX configuration is activated by the control information 230, one or more uplink transmit occasions, which overlapped with active time of the network entity 105, may now be within an inactive duration 215 of the activated cell DRX configuration. As such, the UCI 225 may skip indicating the one or more uplink transmit occasions. In other words, uplink transmit occasions may dynamically flip between being valid or invalid (e.g., and hence indicated or skipped by the UCI 225) in accordance with the control information 230.

Additionally, or alternatively, a size of the UCI 225 (e.g., a window size) may be adjusted based on receiving the DCI extending a period of the active duration 210. For example, additional bits may be included in the UCI 225 (e.g., relative to a quantity of bits corresponding to a configured window size to expand the configured window size) accommodating for one or more uplink transmit occasions that overlap with the extended active period. In other words, the UCI 225 may indicate whether the UE 115-*a* is to use one or more uplink transmit occasions overlapping with the extended active time (e.g., previously within an inactive duration 215).

Figure 3:
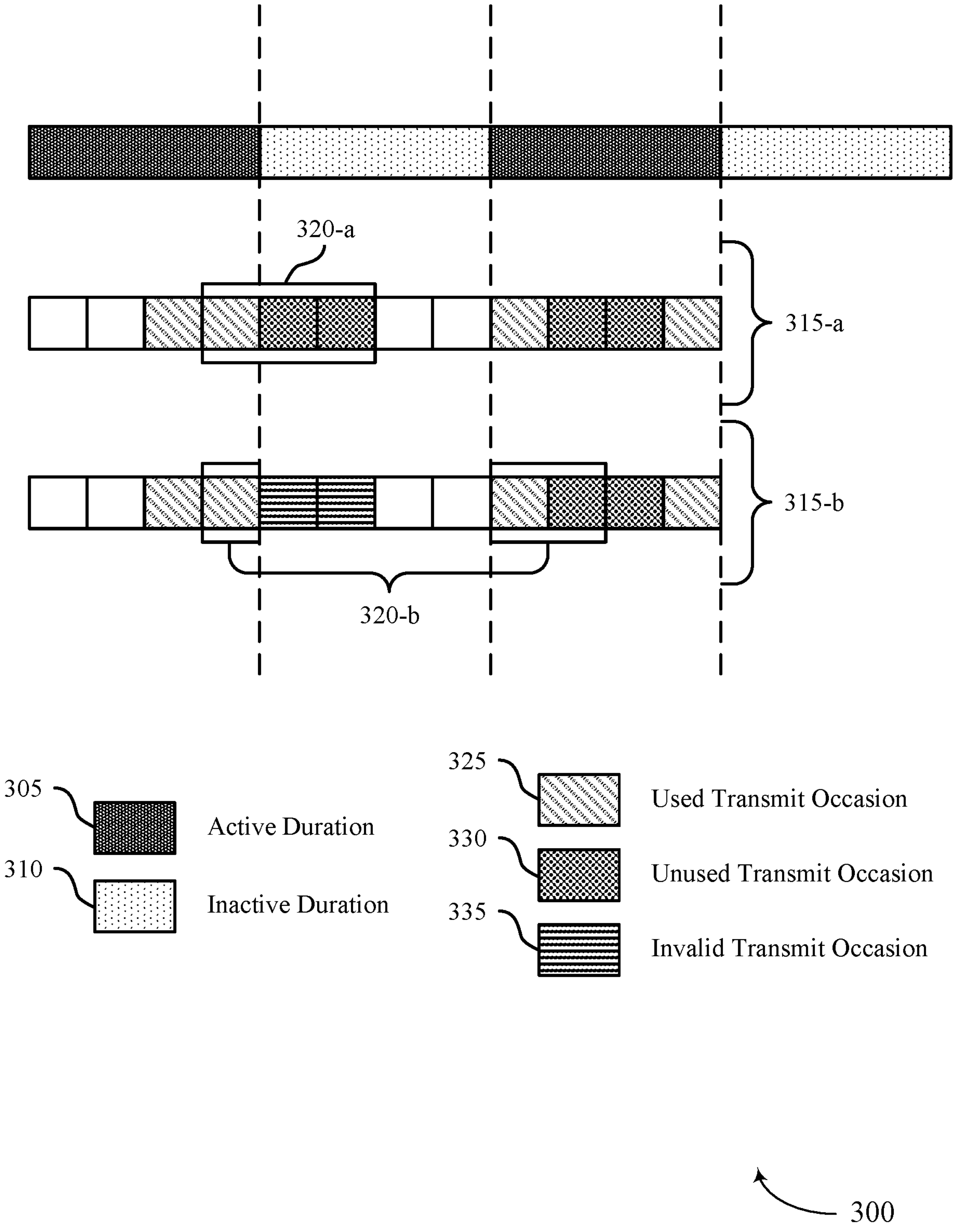
FIG. 3 shows an example of a communication diagram that supports uplink transmit occasion UCI for a cell discontinuous communication cycle in accordance with one or more aspects of the present disclosure.

FIG. 3 shows an example of a communication diagram 300 that supports uplink transmit occasion UCI for a cell discontinuous communication cycle in accordance with one or more aspects of the present disclosure. The communication diagram 300 may implement or be implemented by various aspects of the wireless communications system 100, the wireless communications system 200, or both. For example, the communication diagram 300 may be implemented by a UE 115 and a network entity 105, which may be examples of corresponding devices as described with reference to FIG. 1 and FIG. 2.

A network entity may operate according to a cell DRX configuration that indicates a periodic active duration 305 (e.g., active periods) of reception by the network entity and a periodic inactive duration 310 (e.g., inactive periods) of reception by the network entity. For example, the network entity may receive messages from UEs of a cell during the active periods and refrain from receiving messages from UEs during the inactive periods.

Additionally, the network entity may indicate a CG configuration, such as a CG-PUSCH configuration, to a UE. The CG configuration may indicate a set of uplink transmit occasions (e.g., CG-PUSCH transmit occasions) during which the UE may transmit uplink messages (e.g., PUSCH messages) to the network entity. The UE, based on receiving the CG configuration, may transmit UCI (e.g., UCI 225) to the network entity (e.g., during each uplink transmit occasion used by the UE) indicating whether the UE is to use each of a set of subsequent uplink transmit occasions.

In a first communication scenario 315-*a*, the UE may transmit the UCI indicating whether a first set of subsequent transmit occasions 320-*a* are used or unused by the UE. The first set of subsequent transmit occasions 320-*a* may indicate subsequent transmit occasions regardless of the cell DRX configuration. As an example, the UCI may indicate whether one or more uplink transmit occasions overlapping with an inactive duration 310 of the cell DRX configuration are unused by the UE. In the example of FIG. 3, the first set of subsequent transmit occasions 320-*a* may include a used transmit occasion 325 (e.g., an uplink transmit occasion indicated to be used by the UE) and two unused transmit occasions 330 (e.g., uplink transmit occasions indicated to be unused by the UE). However, the UE may be configured to drop uplink transmit occasions that are within an inactive duration 310. The network entity may also know that the UE is configured to drop such uplink transmit occasions. Accordingly, in the first communication scenario 315-*a*, the UCI may redundantly indicate whether the UE is to use two transmit occasions that are overlapping with the inactive duration 310, thereby wasting the resources used to indicate the use or unuse of the two transmit occasions. Additionally, due a window size of the UCI, the UE may be unable to indicate whether uplink transmit occasions of a next active duration are used or unused by the UE before these uplink transmit occasions occur. For example, because the window size of the UCI does not span the inactive duration and extend into the next active duration and because the UE may not transmit UTO-UCI outside of a used uplink transmit occasion, the UE may, in some cases, be unable indicate whether a first uplink transmit occasion of the next active duration is used or unused. As such, the network entity may not know whether the uplink transmit occasion is used or unused and may be unable to reallocate the uplink transmit occasion if it is unused by the UE due to the uncertainty. Here, such an uplink transmit occasion, if unused, would be wasted.

In a second communication scenario 315-*b*, the UE may transmit the UCI indicating whether a second set of subsequent transmit occasions 320-*b* are used or unused by the UE. The second set of subsequent transmit occasions 320-*b* may include a quantity of subsequent transmit occasions which overlap with periods of the active duration 305 of the cell DRX configuration. Uplink transmit occasions overlapping with the active duration 305 may be considered valid uplink transmit occasions, while uplink transmit occasions within (e.g., overlapping with) an inactive duration 310 may be considered invalid transmit occasions 335.

In the second communication scenario 315-*b*, the UE may transmit the UCI to indicate whether the UE is to use subsequent valid uplink transmit occasions. For example, the UCI may indicate that a first and second transmit occasion will be the used transmit occasions 325 and that a third transmit occasion will be an unused transmit occasion 330. The UE may not indicate whether it is to use invalid transmit occasions 335 occurring during the inactive durations 310. In the example of FIG. 3, the first uplink transmit occasion may overlap with a first period of the active duration 305 and the second and third transmit occasions may overlap with a second period of the active duration 305. As such, the UE may use the UCI to indicate uplink transmit occasions are used or unused over multiple periods of the active duration 305.

Thus, the UCI may indicate whether subsequent valid uplink transmit occasions are unused by the UE (e.g., used transmit occasions 325, unused transmit occasions 330) while skipping indicating whether subsequent invalid transmit occasions 335 are unused by the UE. For example, an uplink transmit occasion (e.g., a CG-PUSCH transmit occasion) during cell DRX inactive time (e.g., during an inactive duration 310) may be considered invalid and may be treated like a CG-PUSCH transmit occasion dropped due to collision with downlink symbol(s) indicated by a TDD uplink-downlink configuration for the UE (e.g., a tdd-UL-DL-ConfigurationCommon or tdd-UL-DL-ConfigurationDedicated) or collision with SSB(s). That is, uplink transmit occasions during cell DRX inactive time may be invalid and dropped by the UE, and as such, the valid uplink transmit occasions indicated as used or unused by the UCI may exclude (e.g., skip) invalid uplink transmit occasions.

In some examples, the UE may use the UCI to indicate whether the UE is to use the subsequent valid uplink transmit occasions according to a window size. For example, the UE may receive an indication of a window size associated with UTO-UCI, where the UE indicates whether a quantity of subsequent valid uplink transmit occasions corresponding to the window size are used or unused. In the example of FIG. 3, the UE may receive an indication of a window size of three (e.g., "Nu=3") and, and UCI may indicate whether the UE is to use a next three valid uplink transmit occasions. That is, the window size may be applicable to valid uplink transmit occasions and inapplicable to invalid uplink transmit occasions.

The UCI may indicate whether consecutive valid uplink transmit occasions are used or unused. Because the UCI skips indicating whether invalid uplink transmit occasions are used or unused, the quantity of uplink transmit occasions indicated as used or unused by the UCI may include one or more non-consecutive uplink transmit occasions (e.g., one or more invalid transmit occasions 335 may occur between one or more of the indicated quantity of uplink transmit occasions). For example, the first transmit occasions of the second set of transmit occasions 320-*b* may be non-consecutive with the second and third uplink transmit occasions of the second set of transmit occasions 320-*b* (e.g., two invalid transmit occasions 335 may occur between the first and second transmit occasions). However, the second set of transmit occasions 320-*b* may be consecutive with respect to one or more periods of the active duration 305. For example, excluding the inactive duration 310 between the first and second transmit occasions of the second set of transmit occasions 320-*b*, the first and second transmit occasions may be consecutive.

Figure 4:
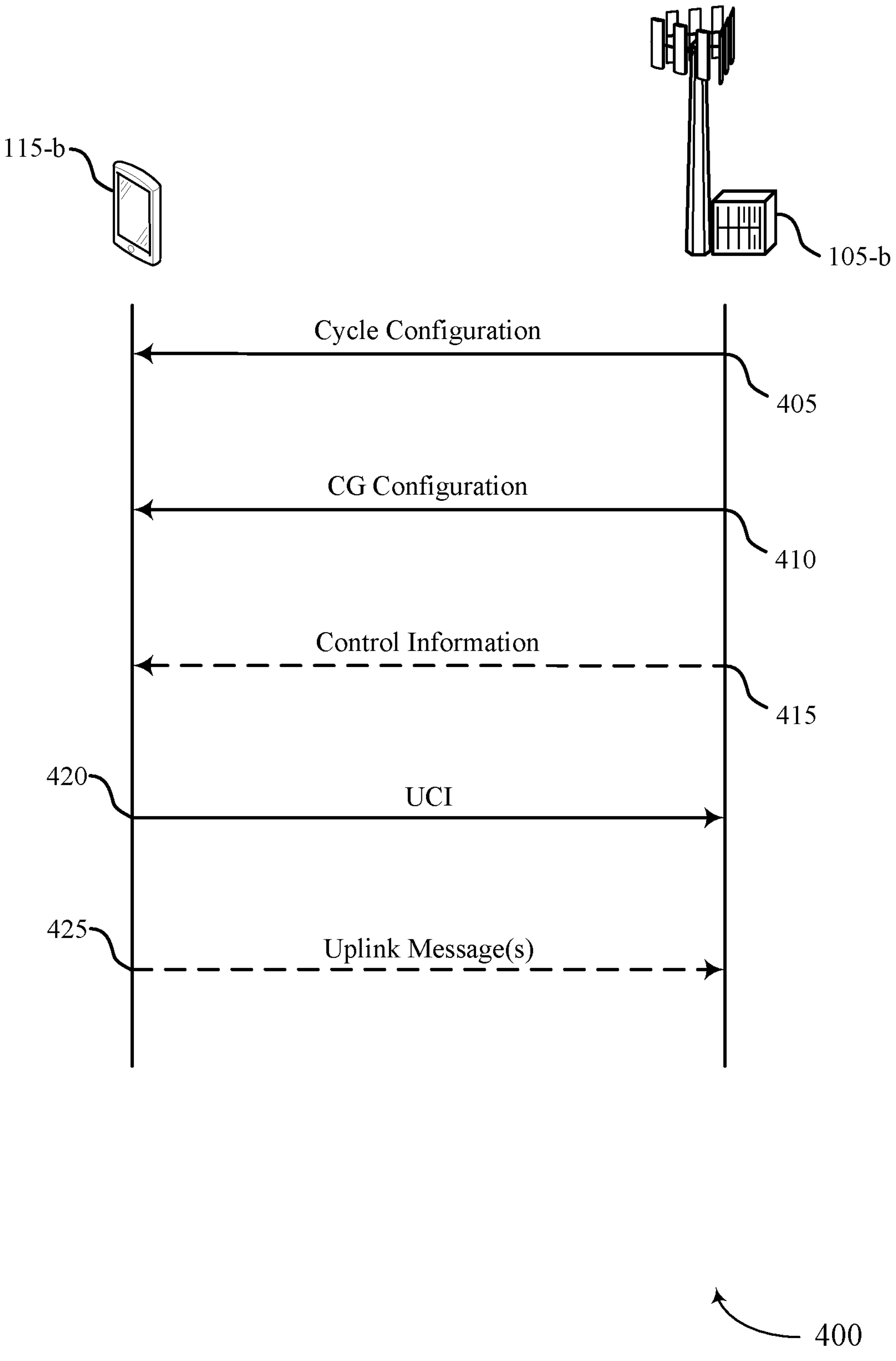
FIG. 4 shows an example of a process flow that supports uplink transmit occasion UCI for a cell discontinuous communication cycle in accordance with one or more aspects of the present disclosure.

FIG. 4 shows an example of a process flow 400 that supports uplink transmit occasion UCI for a cell discontinuous communication cycle in accordance with one or more aspects of the present disclosure. In some examples, the process flow 400 may implement or be implemented by aspects of the wireless communications system 100, the wireless communications system 200, and the communication diagram 300 described with reference to FIGS. 1 through 3. For example, the process flow 400 may include a network entity 105-*b* and a UE 115-*b*, which may be examples of corresponding devices as described with reference to FIGS. 1 through 3.

Alternative examples of the following may be implemented, where some operations are performed in a different order than described or are not performed at all. In some cases, operations may include additional features not mentioned below, or further operations may be added. Although the network entity 105-*b* and the UE 115-*b* are shown performing the operations of the process flow 400, some aspects of some operations may also be performed by one or more other wireless devices (such as by multiple network entities 105, or in accordance with coordination among multiple network entities 105).

At 405, the network entity 105-*b* may indicate a cell DRX configuration to the UE 115-*b*. For example, the network entity 105-*b* may indicate, via first control information (e.g., RRC signaling, DCI, MAC-CE,) the cell DRX configuration to the UE 115-*b* (e.g., and other UEs 115 of the cell). In some examples, the cell DRX configuration may be associated with a serving cell of the UE 115-*b* (e.g., the cell served by the network entity 105-*b*). The cell DRX configuration may indicate a periodic DRX cycle including, within each period, an active duration of the serving cell and an inactive duration of the serving cell. In other words, the cell DRX configuration may indicate a periodic active duration of serving cell reception and a periodic inactive duration of the serving cell reception.

For example, the network entity 105-*b* may indicate the cell DRX configuration to the UE 115-*b* such that the UE 115-*b* may communicate uplink messages with the network entity 105-*b* during periods of the active duration and refrain from communicating uplink messages with the network entity 105-*b* during periods of the inactive duration. In other words, the UE 115-*b* may communicate uplink messages with the network entity 105-*b* according to the indicated cell DRX configuration for the serving cell.

At 410, the network entity 105-*b* may indicate a CG configuration. For example, the network entity may indicate, via second control information (e.g., RRC message, MAC-CE, DCI) the CG configuration to the UE 115-*b*. In some examples, the CG configuration may be referred to as a CG uplink transmit occasion configuration (e.g., a CG-PUSCH transmit occasion configuration) that indicates a periodicity of a set of CG uplink transmit occasions. For example, the CG configuration may indicate CG-PUSCH transmit occasions (e.g., periodic set of CG-PUSCH transmit occasions) during which the UE 115-*b* may transmit uplink messages (e.g., PUSCH messages) to the network entity 105-*b*.

At 415, the network entity 105-*b* may transmit control information to the UE 115-*b*. For example, the control information may indicate a window size of a UCI, activate the cell DRX configuration, deactivate the cell DRX configuration, extend one or more periods of an active duration, or a combination thereof.

The window size, for example, may be applicable to CG uplink transmit occasions that overlap with the active duration and may be inapplicable to CG uplink transmit occasions that are within the inactive duration. For example, the UCI may be associated with a quantity of CG uplink transmit occasions corresponding to the window size, where the quantity of CG uplink transmit occasions includes the CG uplink transmit occasions that are overlapping with a period of the active duration and excludes the CG uplink transmit occasions which are within a period of the inactive duration.

At 420, the UE 115-*b* may transmit the UCI to the network entity 105-*b*. For example, the UE 115-*b* may transmit the UCI indicating whether each of a quantity of subsequent CG uplink transmit occasions that overlap with the active duration are unused by the UE 115-*b*. The UE 115-*b* may transmit the UCI during a CG uplink transmit occasion the multiple CG uplink transmit occasions overlapping with the active duration.

In some examples, the UCI may indicate whether the subsequent valid CG uplink transmit occasions are used by the UE 115-*b*. The UCI, for example, may skip indicating whether subsequent invalid CG uplink transmit occasions are unused by the UE 115-*b*. A valid CG uplink transmit occasion may at least partially overlap with the active duration while an invalid CG uplink transmit occasion may be within the inactive duration. That is, the quantity of subsequent CG uplink transmit occasions indicated by the UE 115-*b* as used or unused via the UCI at 415 may be valid CG uplink transmit occasion, and the UCI may skip indicating whether each of a second quantity of CG uplink transmit occasions that are within the inactive duration are unused. In other words, the UE 115-*b* may skip indicating the second quantity of CG uplink transmit occasions that are invalid.

In some examples, the subsequent CG uplink transmit occasions may be non-consecutive CG uplink transmit occasions in a time domain, consecutive in the time domain with respect to one or more periods of the active duration, or both. For example, the CG uplink transmit occasions may be considered to be consecutive if CG uplink transmit occasions within the inactive duration are excluded, but the CG uplink transmit occasions may be considered to be non-consecutive when including CG uplink transmit occasions within the inactive duration.

In some examples, the control information may activate or deactivate the cell DRX configuration of the serving cell. In some examples, the UCI may include indications for, based on the cell DRX configuration being activated, CG uplink transmit occasions that overlap with the active duration and exclude indications for CG uplink transmit occasions that occur within the inactive duration.

Additionally, or alternatively, the control information may extend an active duration for a period of the active duration. In some examples, one or more of the subsequent CG uplink transmit occasions indicated by the UCI may overlap with a portion of the extended active duration. That is, one or more CG uplink transmit occasions that were previously invalid may overlap with the extended active duration and thus be considered valid (e.g., dynamically flipped to valid occasions). In some examples, a quantity of bits of the UCI may be increased based on the extended active duration. For example, the quantity of bits of the UCI may increase relative to the configured window size associated with the UCI. In other words, the UCI may have an increased quantity of bits such that the UCI may indicate whether one or more of the CG uplink transmit occasions that overlap with the extended active duration (e.g., are flipped to valid occasions) are unused by the UE 115-*b*.

At 425, the UE 115-*b* may transmit one or more uplink messages in accordance with the UCI. For example, the UE 115-*b* may transmit an uplink message during one of the valid CG uplink transmit occasions indicated as to be used by the UE 115-*b* in the UCI. The UE 115-*b* may transmit the one or more uplink messages during the active duration of the serving cell.

Figure 5:
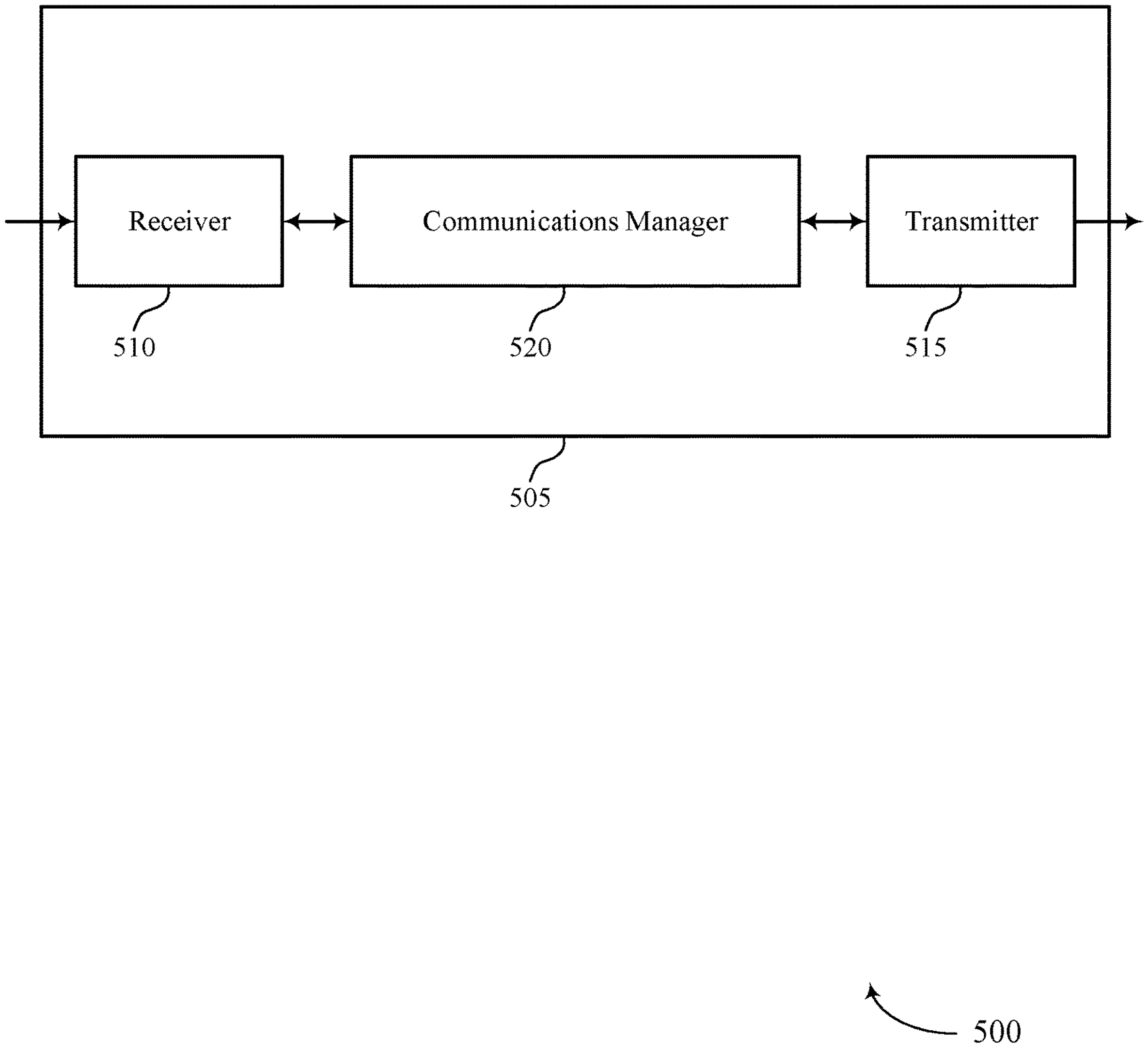
FIGS. 5 and 6 show block diagrams of devices that support uplink transmit occasion UCI for a cell discontinuous communication cycle in accordance with one or more aspects of the present disclosure.

FIG. 5 shows a block diagram 500 of a device 505 that supports uplink transmit occasion UCI for a cell discontinuous communication cycle in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink transmit occasion UCI for a cell discontinuous communication cycle). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink transmit occasion UCI for a cell discontinuous communication cycle). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of uplink transmit occasion UCI for a cell discontinuous communication cycle as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving first control information including a cell DRX configuration of a serving cell of the UE, the cell DRX configuration indicating a periodic active duration of serving cell reception and a periodic inactive duration of the serving cell reception. The communications manager 520 is capable of, configured to, or operable to support a means for receiving second control information including a CG configuration that indicates CG-PUSCH transmit occasions. The communications manager 520 is capable of, configured to, or operable to support a means for transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, and more efficient utilization of communication resources.

Figure 6:
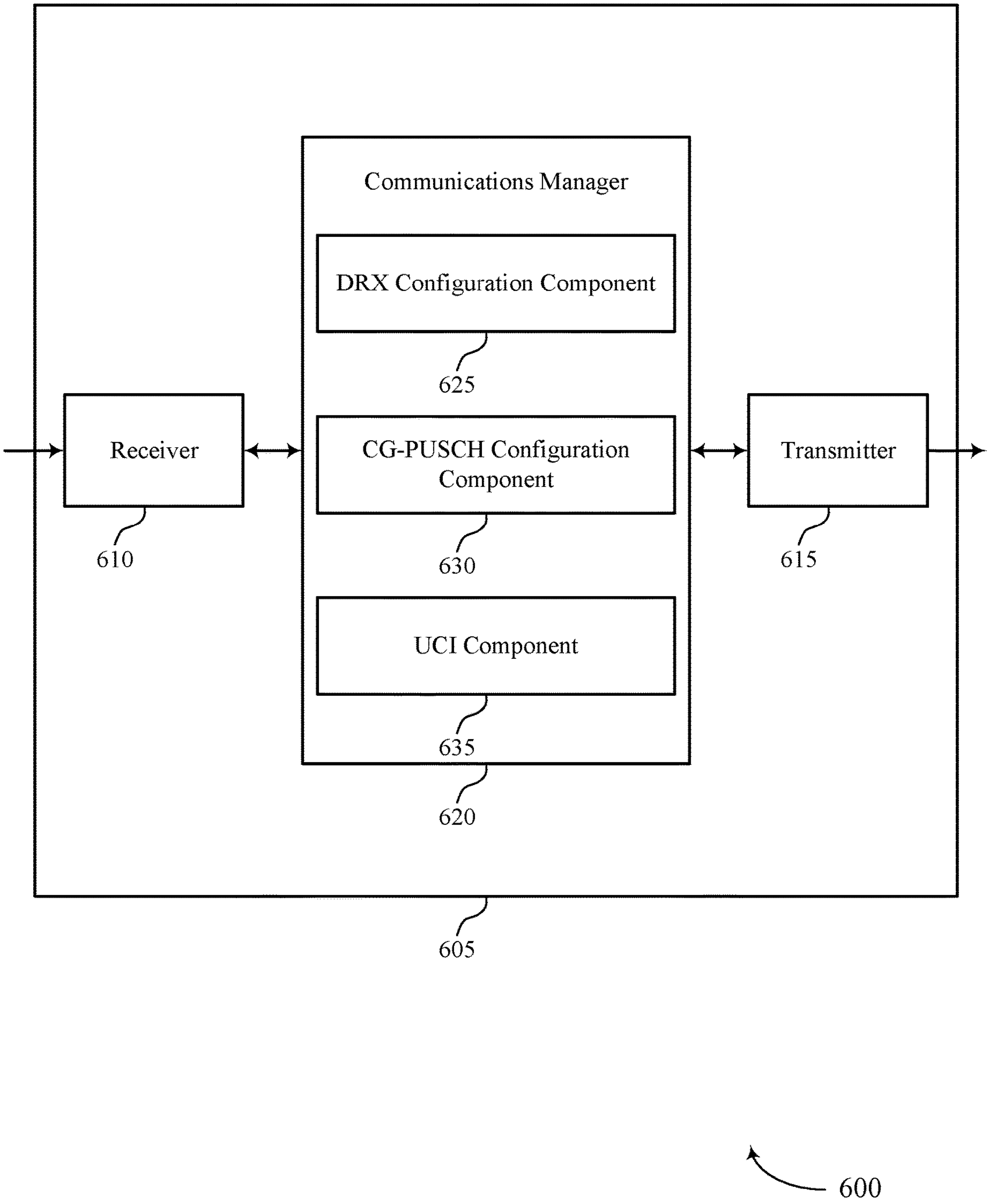

FIG. 6 shows a block diagram 600 of a device 605 that supports uplink transmit occasion UCI for a cell discontinuous communication cycle in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink transmit occasion UCI for a cell discontinuous communication cycle). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink transmit occasion UCI for a cell discontinuous communication cycle). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of uplink transmit occasion UCI for a cell discontinuous communication cycle as described herein. For example, the communications manager 620 may include a DRX configuration component 625, a CG-PUSCH configuration component 630, a UCI component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The DRX configuration component 625 is capable of, configured to, or operable to support a means for receiving first control information including a cell DRX configuration of a serving cell of the UE, the cell DRX configuration indicating a periodic active duration of serving cell reception and a periodic inactive duration of the serving cell reception. The CG-PUSCH configuration component 630 is capable of, configured to, or operable to support a means for receiving second control information including a CG configuration that indicates CG-PUSCH transmit occasions. The UCI component 635 is capable of, configured to, or operable to support a means for transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

Figure 7:
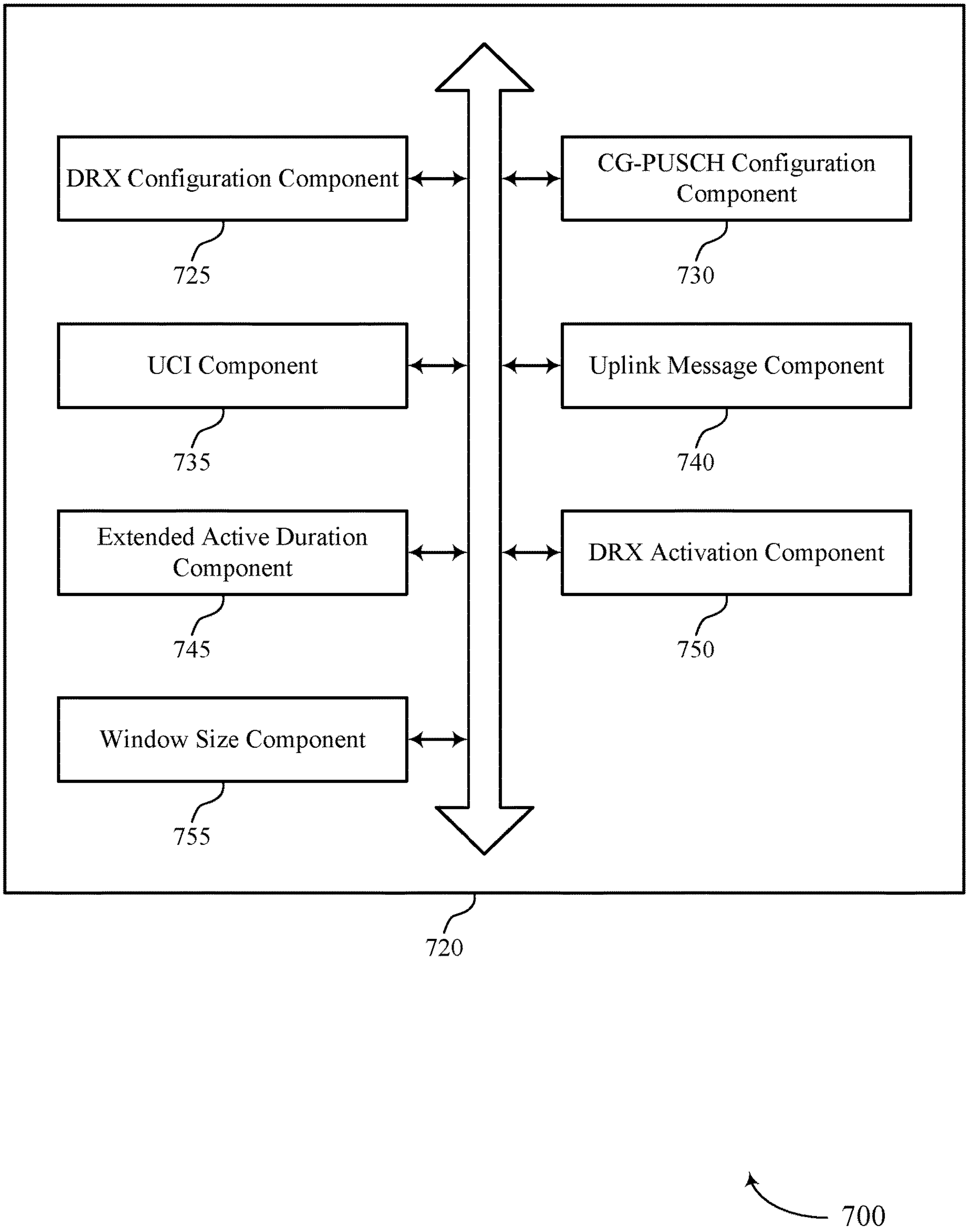
FIG. 7 shows a block diagram of a communications manager that supports uplink transmit occasion UCI for a cell discontinuous communication cycle in accordance with one or more aspects of the present disclosure.

FIG. 7 shows a block diagram 700 of a communications manager 720 that supports uplink transmit occasion UCI for a cell discontinuous communication cycle in accordance with one or more aspects of the present disclosure. The communications manager 720 may be an example of aspects of a communications manager 520, a communications manager 620, or both, as described herein. The communications manager 720, or various components thereof, may be an example of means for performing various aspects of uplink transmit occasion UCI for a cell discontinuous communication cycle as described herein. For example, the communications manager 720 may include a DRX configuration component 725, a CG-PUSCH configuration component 730, a UCI component 735, an uplink message component 740, an active duration component 745, a DRX activation component 750, a window size component 755, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The DRX configuration component 725 is capable of, configured to, or operable to support a means for receiving first control information including a cell DRX configuration of a serving cell of the UE, the cell DRX configuration indicating a periodic active duration of serving cell reception and a periodic inactive duration of the serving cell reception. The CG-PUSCH configuration component 730 is capable of, configured to, or operable to support a means for receiving second control information including a CG configuration that indicates CG-PUSCH transmit occasions. The UCI component 735 is capable of, configured to, or operable to support a means for transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

In some examples, the uplink message component 740 is capable of, configured to, or operable to support a means for transmitting, during one of the quantity of subsequent CG-PUSCH transmit occasions used by the UE, one or more uplink messages in accordance with the UCI.

In some examples, the UCI indicates whether subsequent valid CG-PUSCH transmit occasions are unused by the UE and skips indicating whether subsequent invalid CG-PUSCH transmit occasions are unused by the UE. In some examples, a valid CG-PUSCH transmit occasion at least partially overlaps with the periodic active duration. In some examples, an invalid CG-PUSCH transmit occasion is within the periodic inactive duration. In some examples, the quantity of subsequent CG-PUSCH transmit occasions are valid CG-PUSCH transmit occasions.

In some examples, the UCI skips indicating whether each of a second quantity of subsequent CG-PUSCH transmit occasions that are within the periodic inactive duration are unused by the UE.

In some examples, the quantity of subsequent CG-PUSCH transmit occasions overlap with multiple periods of the periodic active duration.

In some examples, the extended active duration component 745 is capable of, configured to, or operable to support a means for receiving third control information that extends an active duration for a period of the periodic active duration, where one or more of the subsequent CG-PUSCH transmit occasions indicated by the UCI overlap with a portion of the active duration extended by the third control information.

In some examples, a quantity of bits of the UCI is increased relative to a configured window size associated with the UCI based on the third control information extending the active duration for the period of the periodic active duration.

In some examples, the DRX activation component 750 is capable of, configured to, or operable to support a means for receiving third control information activating the cell DRX configuration of the serving cell, where one or more CG-PUSCH transmit occasions that are subsequent to the CG-PUSCH transmit occasion are excluded from the subsequent CG-PUSCH transmit occasions indicated by the UCI based on the one or more CG-PUSCH transmit occasions being within the periodic inactive duration of the activated cell DRX configuration.

In some examples, the window size component 755 is capable of, configured to, or operable to support a means for receiving third control information indicating a window size of the UCI, where the window size is applicable to CG-PUSCH transmit occasions that overlap with the periodic active duration and is inapplicable to CG-PUSCH transmit occasions that are within the periodic inactive duration.

In some examples, the subsequent CG-PUSCH transmit occasions include one or more non-consecutive CG-PUSCH transmit occasions in a time domain.

In some examples, the subsequent CG-PUSCH transmit occasions are consecutive in the time domain with respect to one or more periods of the periodic active duration.

In some examples, one or more of the CG-PUSCH transmit occasions overlap with the periodic inactive duration.

Figure 8:
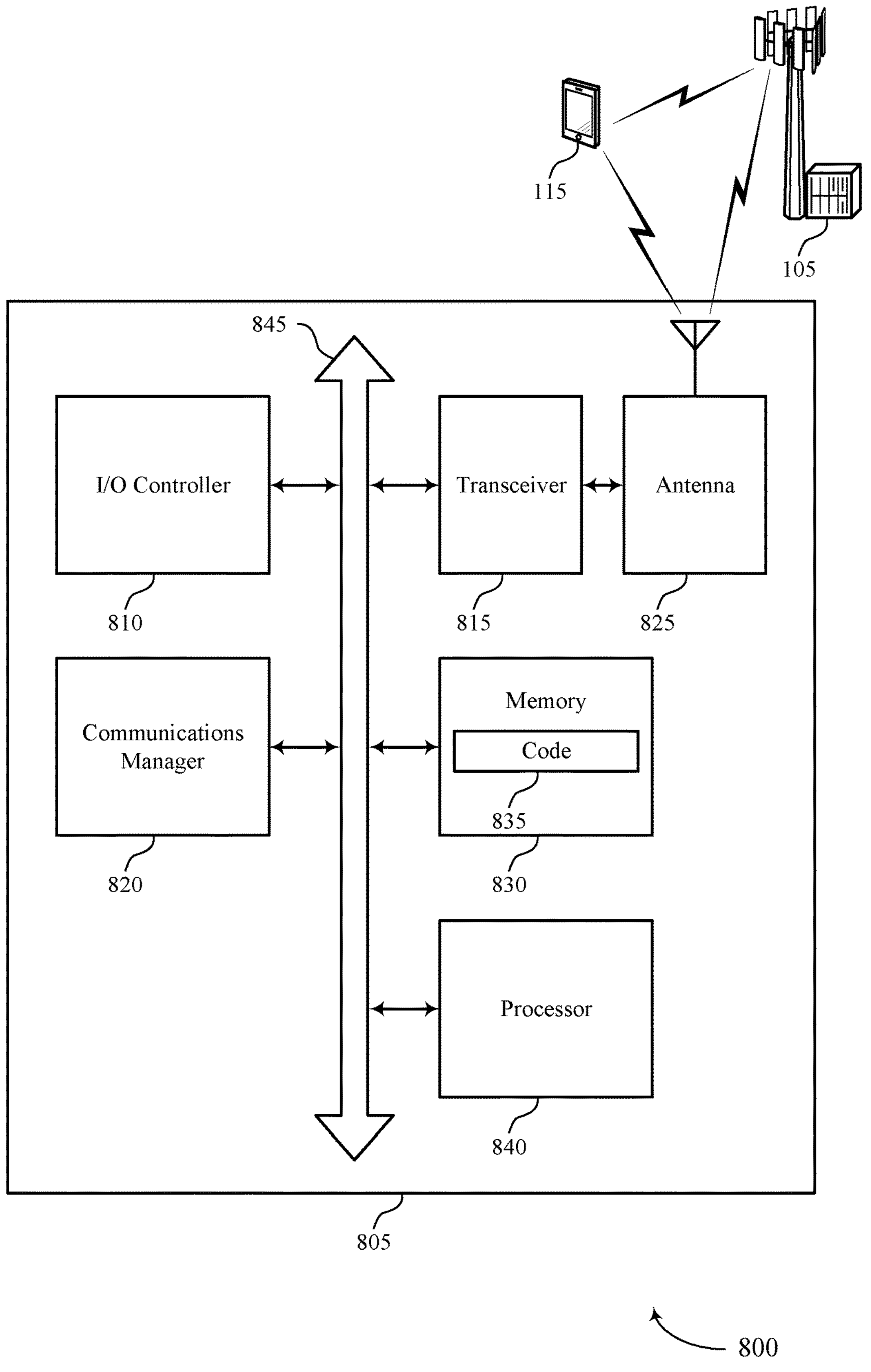
FIG. 8 shows a diagram of a system including a device that supports uplink transmit occasion UCI for a cell discontinuous communication cycle in accordance with one or more aspects of the present disclosure.

FIG. 8 shows a diagram of a system 800 including a device 805 that supports uplink transmit occasion UCI for a cell discontinuous communication cycle in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting uplink transmit occasion UCI for a cell discontinuous communication cycle). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving first control information including a cell DRX configuration of a serving cell of the UE, the cell DRX configuration indicating a periodic active duration of serving cell reception and a periodic inactive duration of the serving cell reception. The communications manager 820 is capable of, configured to, or operable to support a means for receiving second control information including a CG configuration that indicates CG-PUSCH transmit occasions. The communications manager 820 is capable of, configured to, or operable to support a means for transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

By including or configuring the communications manager 820 in accordance with examples as described herein, the device 805 may support techniques for improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of uplink transmit occasion UCI for a cell discontinuous communication cycle as described herein, or the at least one processor 840 and the at least one memory 830 may be otherwise configured to, individually or collectively, perform or support such operations.

Figure 9:
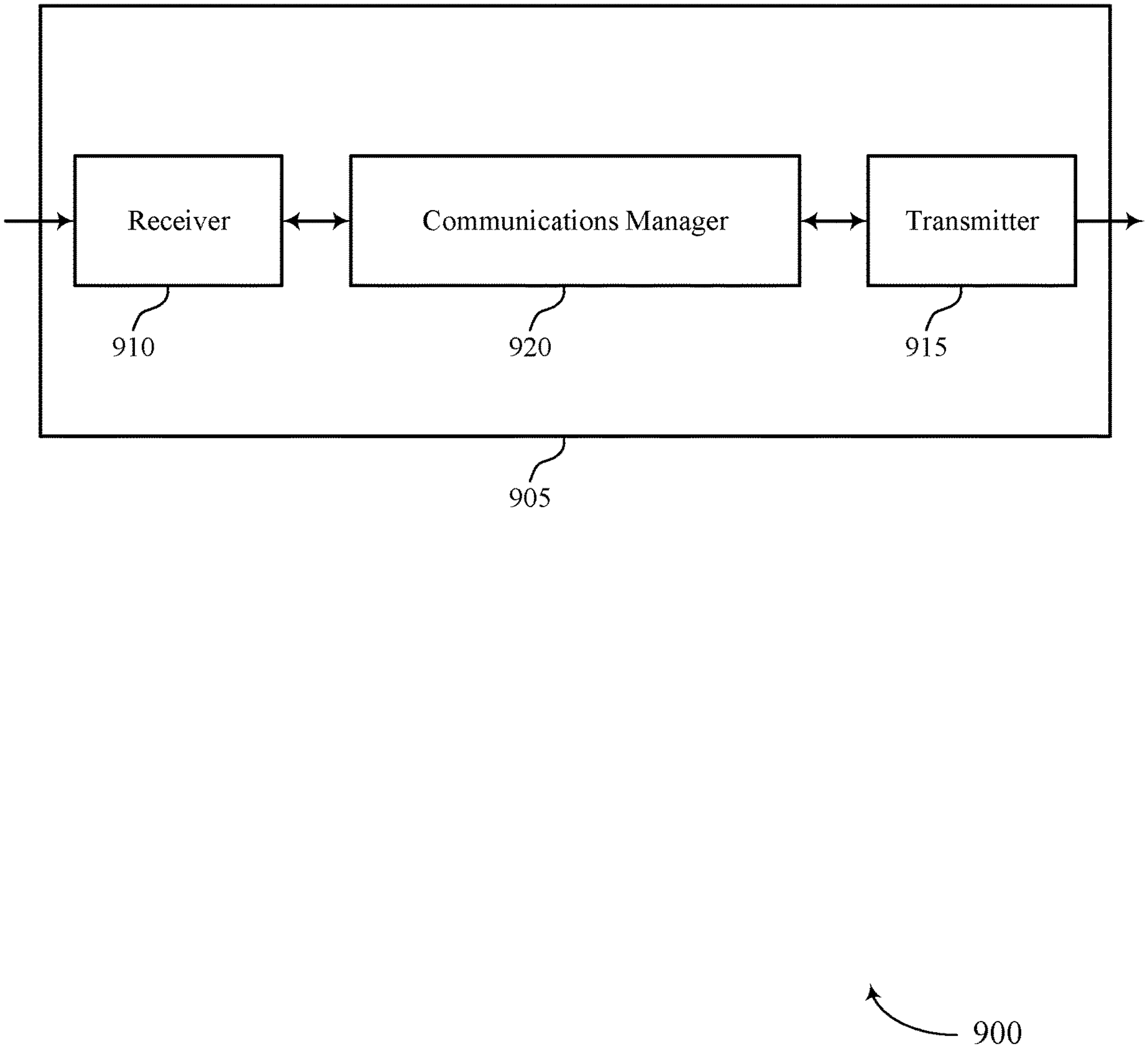
FIGS. 9 and 10 show block diagrams of devices that support uplink transmit occasion UCI for a cell discontinuous communication cycle in accordance with one or more aspects of the present disclosure.

FIG. 9 shows a block diagram 900 of a device 905 that supports uplink transmit occasion UCI for a cell discontinuous communication cycle in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of uplink transmit occasion UCI for a cell discontinuous communication cycle as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting first control information including a cell DRX configuration of a serving cell of a UE, the cell DRX configuration indicating a periodic active duration of serving cell reception and a periodic inactive duration of serving cell reception. The communications manager 920 is capable of, configured to, or operable to support a means for transmitting second control information including a CG configuration that indicates CG-PUSCH transmit occasions. The communications manager 920 is capable of, configured to, or operable to support a means for receiving, during a CG-PUSCH transmit occasion, UCI indicating whether each of a quantity of subsequent CG-PUSCH transmit occasions that overlap with one or more periods of the periodic active duration are unused by the UE.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources.

Figure 10:
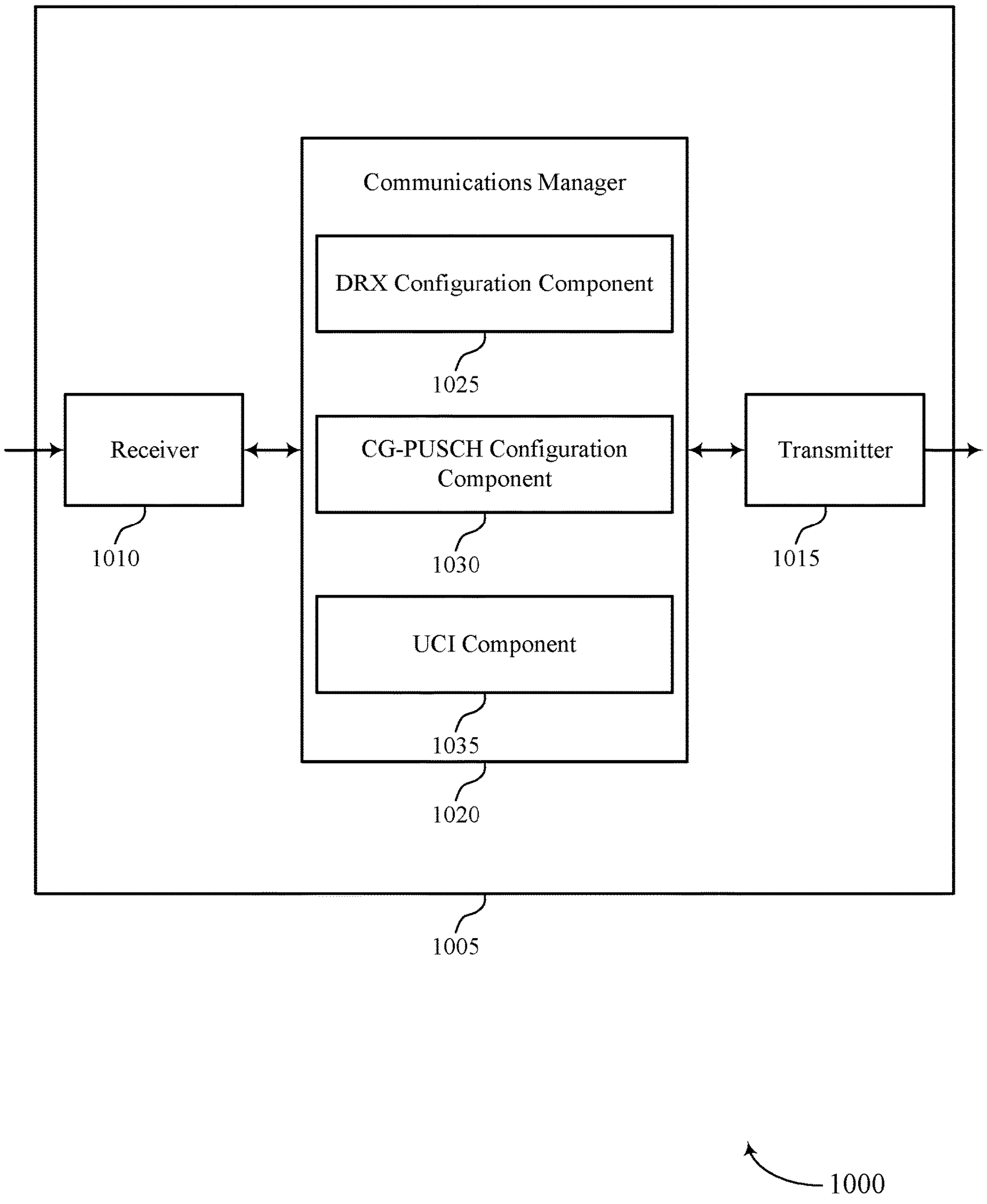

FIG. 10 shows a block diagram 1000 of a device 1005 that supports uplink transmit occasion UCI for a cell discontinuous communication cycle in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of uplink transmit occasion UCI for a cell discontinuous communication cycle as described herein. For example, the communications manager 1020 may include a DRX configuration component 1025, a CG-PUSCH configuration component 1030, a UCI component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The DRX configuration component 1025 is capable of, configured to, or operable to support a means for transmitting first control information including a cell DRX configuration of a serving cell of a UE, the cell DRX configuration indicating a periodic active duration of serving cell reception and a periodic inactive duration of serving cell reception. The CG-PUSCH configuration component 1030 is capable of, configured to, or operable to support a means for transmitting second control information including a CG configuration that indicates CG-PUSCH transmit occasions. The UCI component 1035 is capable of, configured to, or operable to support a means for receiving, during a CG-PUSCH transmit occasion, UCI indicating whether each of a quantity of subsequent CG-PUSCH transmit occasions that overlap with one or more periods of the periodic active duration are unused by the UE.

Figure 11:
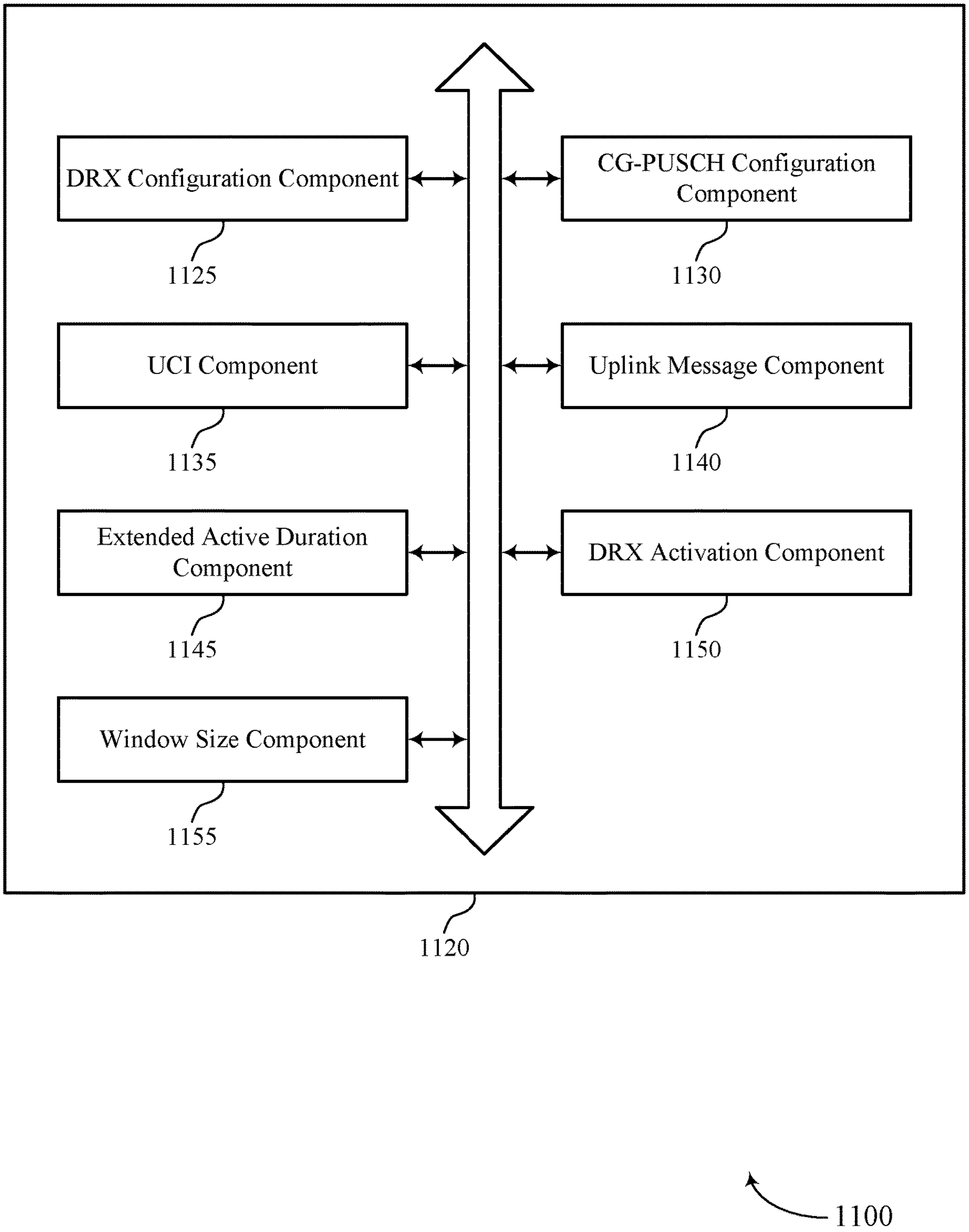
FIG. 11 shows a block diagram of a communications manager that supports uplink transmit occasion UCI for a cell discontinuous communication cycle in accordance with one or more aspects of the present disclosure.

FIG. 11 shows a block diagram 1100 of a communications manager 1120 that supports uplink transmit occasion UCI for a cell discontinuous communication cycle in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of uplink transmit occasion UCI for a cell discontinuous communication cycle as described herein. For example, the communications manager 1120 may include a DRX configuration component 1125, a CG-PUSCH configuration component 1130, a UCI component 1135, an uplink message component 1140, an extended active duration component 1145, a DRX activation component 1150, a window size component 1155, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The DRX configuration component 1125 is capable of, configured to, or operable to support a means for transmitting first control information including a cell DRX configuration of a serving cell of a UE, the cell DRX configuration indicating a periodic active duration of serving cell reception and a periodic inactive duration of serving cell reception. The CG-PUSCH configuration component 1130 is capable of, configured to, or operable to support a means for transmitting second control information including a CG configuration that indicates CG-PUSCH transmit occasions. The UCI component 1135 is capable of, configured to, or operable to support a means for receiving, during a CG-PUSCH transmit occasion, UCI indicating whether each of a quantity of subsequent CG-PUSCH transmit occasions that overlap with one or more periods of the periodic active duration are unused by the UE.

In some examples, the uplink message component 1140 is capable of, configured to, or operable to support a means for receiving, during one of the quantity of subsequent CG-PUSCH transmit occasions used by the UE, one or more uplink messages in accordance with the UCI.

In some examples, the UCI indicates whether subsequent valid CG-PUSCH transmit occasions are used by the UE and skips indicating whether subsequent invalid CG-PUSCH transmit occasions are unused by the UE. In some examples, a valid CG-PUSCH transmit occasion at least partially overlaps with the periodic active duration. In some examples, an invalid CG-PUSCH transmit occasion is within the periodic inactive duration. In some examples, the quantity of subsequent CG-PUSCH transmit occasions are valid CG-PUSCH transmit occasions.

In some examples, the UCI skips indicating whether each of a second quantity of subsequent CG-PUSCH transmit occasions that are within the periodic inactive duration are unused by the UE.

In some examples, the quantity of subsequent CG-PUSCH transmit occasions overlap with multiple periods of the periodic active duration.

In some examples, the extended active duration component 1145 is capable of, configured to, or operable to support a means for transmitting third control information that extends an active duration for a period of the periodic active duration, where one or more of the subsequent CG-PUSCH transmit occasions indicated by the UCI overlap with a portion of the active duration extended by the third control information.

In some examples, the third control information indicates that a quantity of bits associated with a second UCI is greater than a quantity of bits associated with the UCI based in accordance with the third control information extending the active duration for the period of the periodic active duration.

In some examples, the DRX activation component 1150 is capable of, configured to, or operable to support a means for transmitting third control information activating the cell DRX configuration of the serving cell, where one or more CG-PUSCH transmit occasions that are subsequent to the CG-PUSCH transmit occasion are excluded from the subsequent CG-PUSCH transmit occasions indicated by the UCI based on the one or more CG-PUSCH transmit occasions being within the periodic inactive duration of the activated cell DRX configuration.

In some examples, the window size component 1155 is capable of, configured to, or operable to support a means for transmitting third control information indicating a window size of the UCI, where the window size is applicable to CG-PUSCH transmit occasions that overlap with the periodic active duration and is inapplicable to CG-PUSCH transmit occasions that are within the periodic inactive duration.

In some examples, the subsequent CG-PUSCH transmit occasions include one or more non-consecutive CG-PUSCH transmit occasions in a time domain.

In some examples, the subsequent CG-PUSCH transmit occasions are consecutive in the time domain with respect to one or more periods of the periodic active duration.

In some examples, one or more of the CG-PUSCH transmit occasions overlap with the periodic inactive duration.

Figure 12:
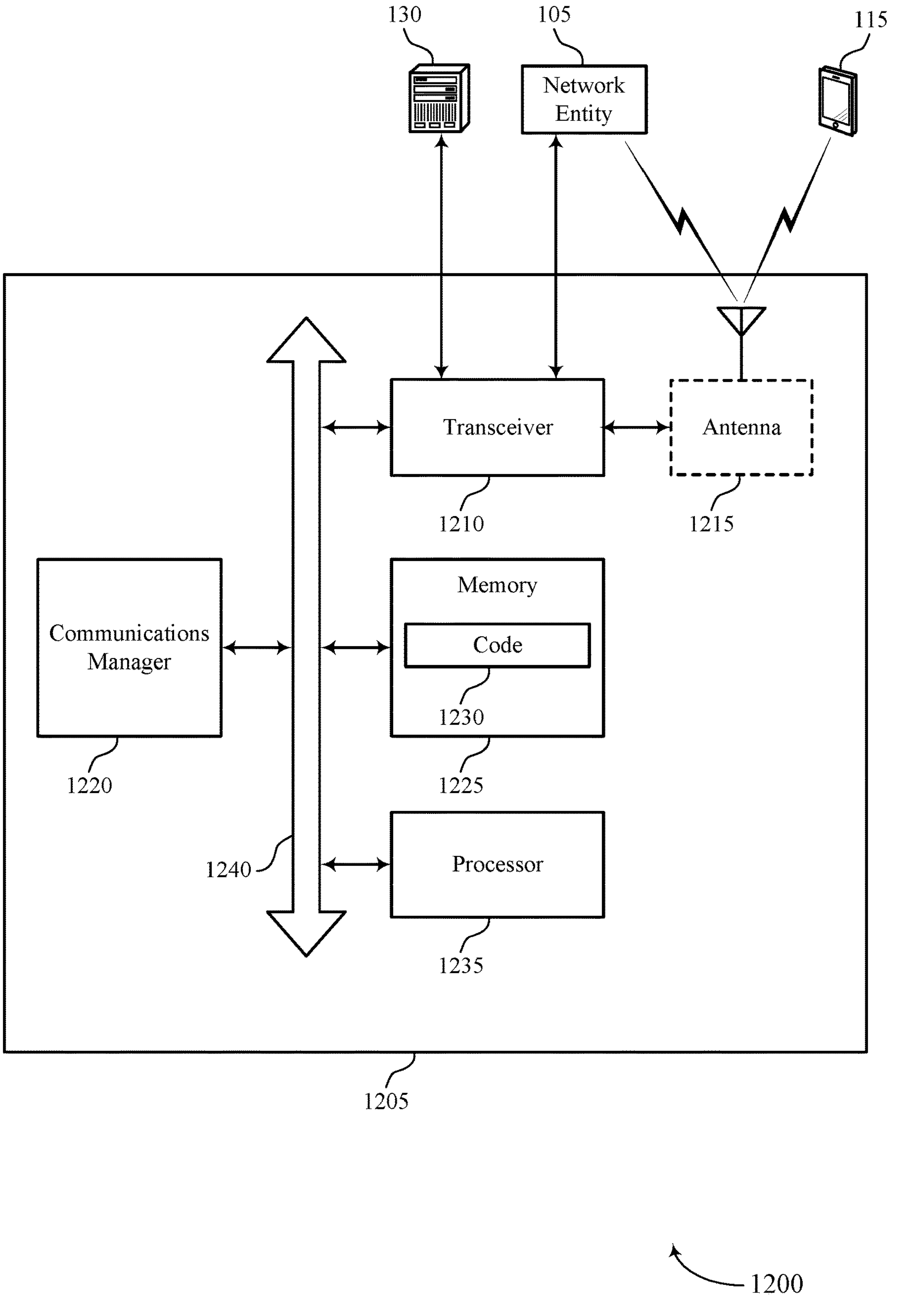
FIG. 12 shows a diagram of a system including a device that supports uplink transmit occasion UCI for a cell discontinuous communication cycle in accordance with one or more aspects of the present disclosure.

FIG. 12 shows a diagram of a system 1200 including a device 1205 that supports uplink transmit occasion UCI for a cell discontinuous communication cycle in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting uplink transmit occasion UCI for a cell discontinuous communication cycle). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being “configured to,” being “configurable to,” and being “operable to” may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting first control information including a cell DRX configuration of a serving cell of a UE, the cell DRX configuration indicating a periodic active duration of serving cell reception and a periodic inactive duration of serving cell reception. The communications manager 1220 is capable of, configured to, or operable to support a means for transmitting second control information including a CG configuration that indicates CG-PUSCH transmit occasions. The communications manager 1220 is capable of, configured to, or operable to support a means for receiving, during a CG-PUSCH transmit occasion, UCI indicating whether each of a quantity of subsequent CG-PUSCH transmit occasions that overlap with one or more periods of the periodic active duration are unused by the UE.

By including or configuring the communications manager 1220 in accordance with examples as described herein, the device 1205 may support techniques for improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of uplink transmit occasion UCI for a cell discontinuous communication cycle as described herein, or the at least one processor 1235 and the at least one memory 1225 may be otherwise configured to, individually or collectively, perform or support such operations.

Figure 13:
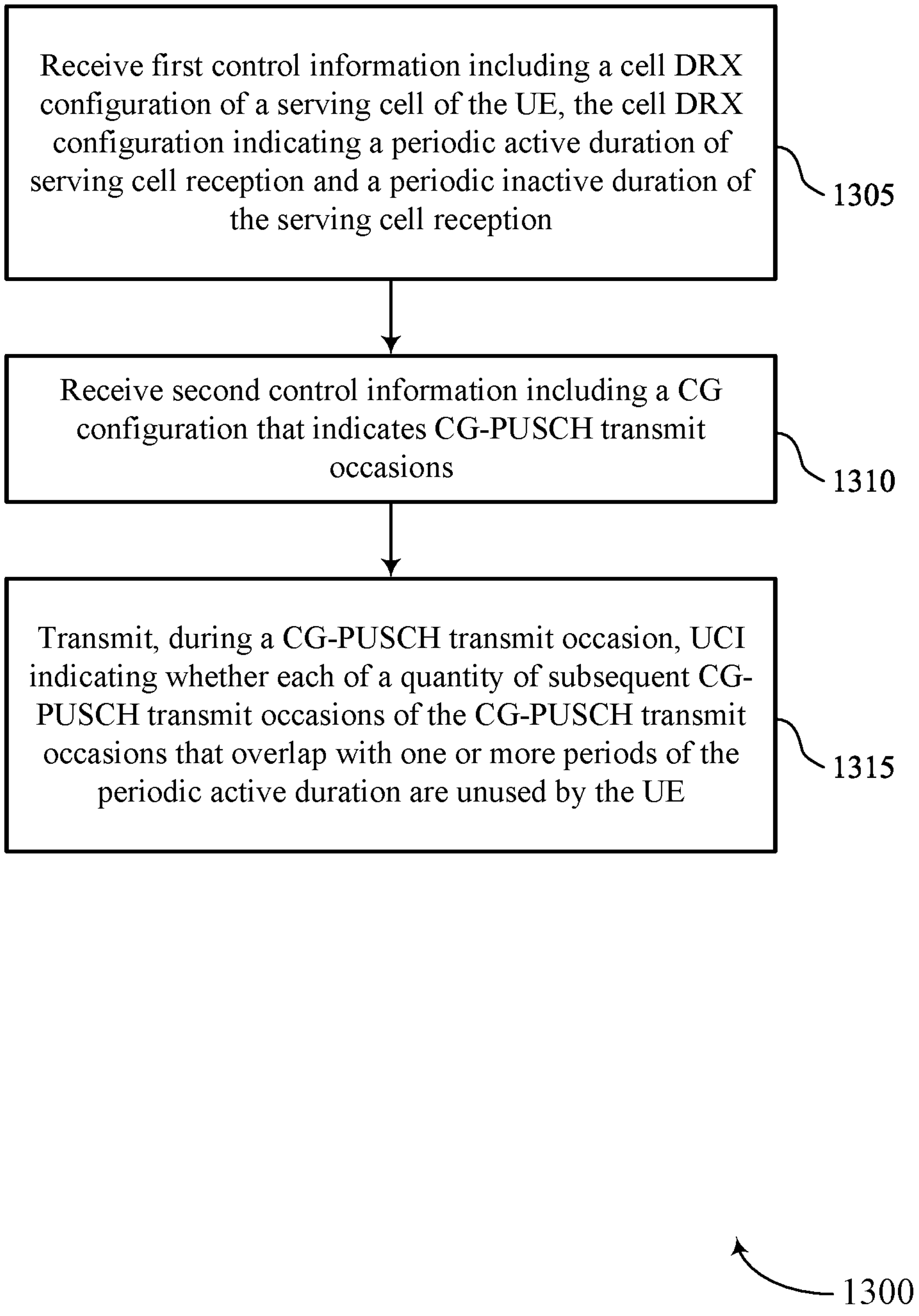

FIG. 13 shows a flowchart illustrating a method 1300 that supports uplink transmit occasion UCI for a cell discontinuous communication cycle in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving first control information including a cell DRX configuration of a serving cell of the UE, the cell DRX configuration indicating a periodic active duration of serving cell reception and a periodic inactive duration of the serving cell reception. The operations of block 1305 may be performed in accordance with examples as disclosed herein. In some examples, aspects of the operations of 1305 may be performed by a DRX configuration component 725 as described with reference to FIG. 7.

At 1310, the method may include receiving second control information including a CG configuration that indicates CG-PUSCH transmit occasions. The operations of block 1310 may be performed in accordance with examples as disclosed herein. In some examples, aspects of the operations of 1310 may be performed by a CG-PUSCH configuration component 730 as described with reference to FIG. 7.

At 1315, the method may include transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE. The operations of block 1315 may be performed in accordance with examples as disclosed herein. In some examples, aspects of the operations of 1315 may be performed by a UCI component 735 as described with reference to FIG. 7.

Figure 14:
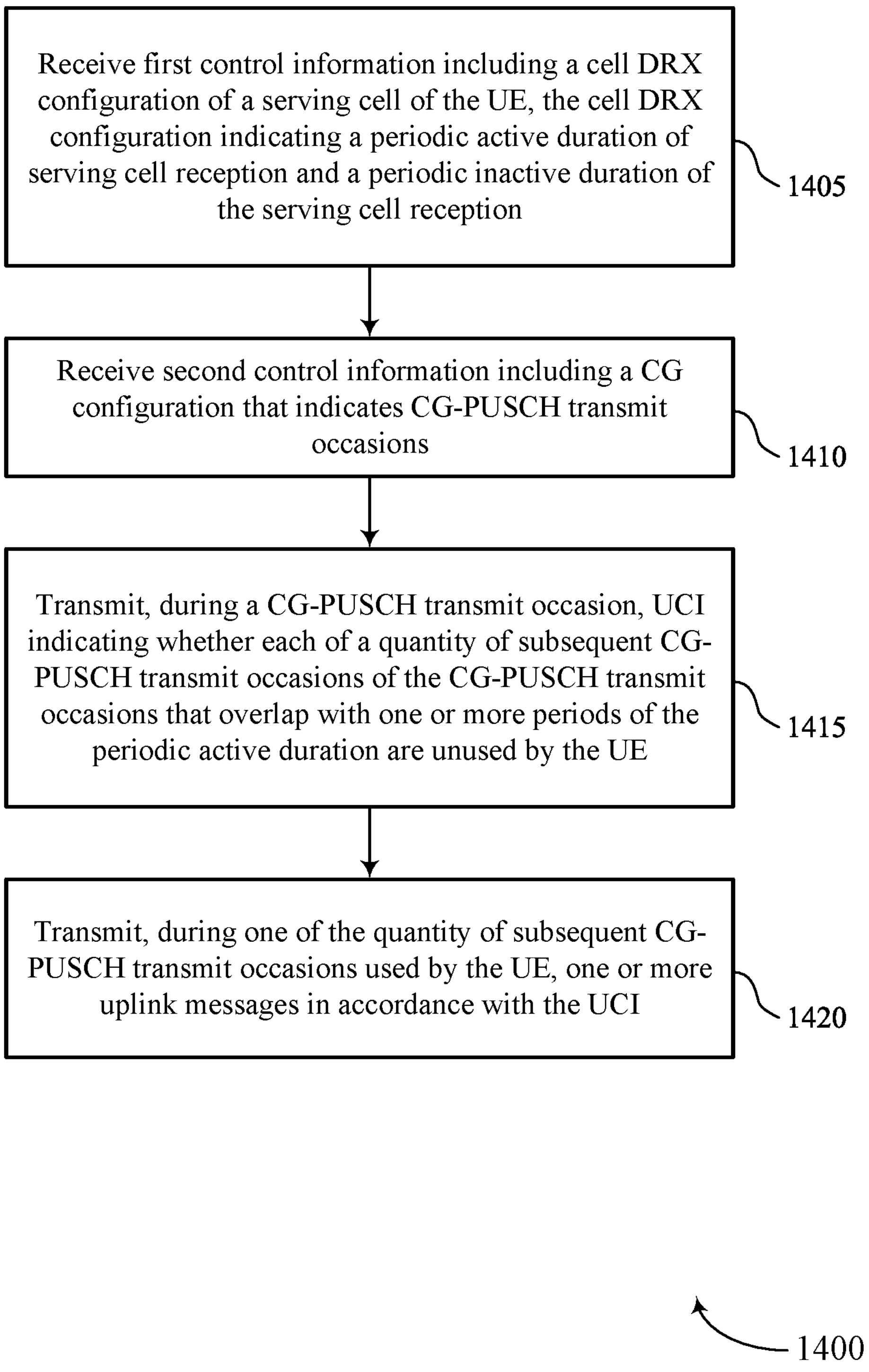

FIG. 14 shows a flowchart illustrating a method 1400 that supports uplink transmit occasion UCI for a cell discontinuous communication cycle in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving first control information including a cell DRX configuration of a serving cell of the UE, the cell DRX configuration indicating a periodic active duration of serving cell reception and a periodic inactive duration of the serving cell reception. The operations of block 1405 may be performed in accordance with examples as disclosed herein. In some examples, aspects of the operations of 1405 may be performed by a DRX configuration component 725 as described with reference to FIG. 7.

At 1410, the method may include receiving second control information including a CG configuration that indicates CG-PUSCH transmit occasions. The operations of block 1410 may be performed in accordance with examples as disclosed herein. In some examples, aspects of the operations of 1410 may be performed by a CG-PUSCH configuration component 730 as described with reference to FIG. 7.

At 1415, the method may include transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE. The operations of block 1415 may be performed in accordance with examples as disclosed herein. In some examples, aspects of the operations of 1415 may be performed by a UCI component 735 as described with reference to FIG. 7.

At 1420, the method may include transmitting, during one of the quantity of subsequent CG-PUSCH transmit occasions used by the UE, one or more uplink messages in accordance with the UCI. The operations of block 1420 may be performed in accordance with examples as disclosed herein. In some examples, aspects of the operations of 1420 may be performed by an uplink message component 740 as described with reference to FIG. 7.

FIG. 15 shows a flowchart illustrating a method 1500 that supports uplink transmit occasion UCI for a cell discontinuous communication cycle in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving first control information including a cell DRX configuration of a serving cell of the UE, the cell DRX configuration indicating a periodic active duration of serving cell reception and a periodic inactive duration of the serving cell reception. The operations of block 1505 may be performed in accordance with examples as disclosed herein. In some examples, aspects of the operations of 1505 may be performed by a DRX configuration component 725 as described with reference to FIG. 7.

At 1510, the method may include receiving second control information including a CG configuration that indicates CG-PUSCH transmit occasions. The operations of block 1510 may be performed in accordance with examples as disclosed herein. In some examples, aspects of the operations of 1510 may be performed by a CG-PUSCH configuration component 730 as described with reference to FIG. 7.

At 1515, the method may include transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE, wherein the UCI indicates whether subsequent valid CG-PUSCH transmit occasions are unused by the UE and skips indicating whether subsequent invalid CG-PUSCH transmit occasions are unused by the UE, wherein a valid CG-PUSCH transmit occasion may at least partially overlap with the periodic active duration, wherein an invalid CG-PUSCH transmit occasion may be within the periodic inactive duration, and wherein the quantity of subsequent CG-PUSCH transmit occasions may be valid CG-PUSCH transmit occasions. The operations of block 1515 may be performed in accordance with examples as disclosed herein. In some examples, aspects of the operations of 1515 may be performed by a UCI component 735 as described with reference to FIG. 7.

Figure 16:
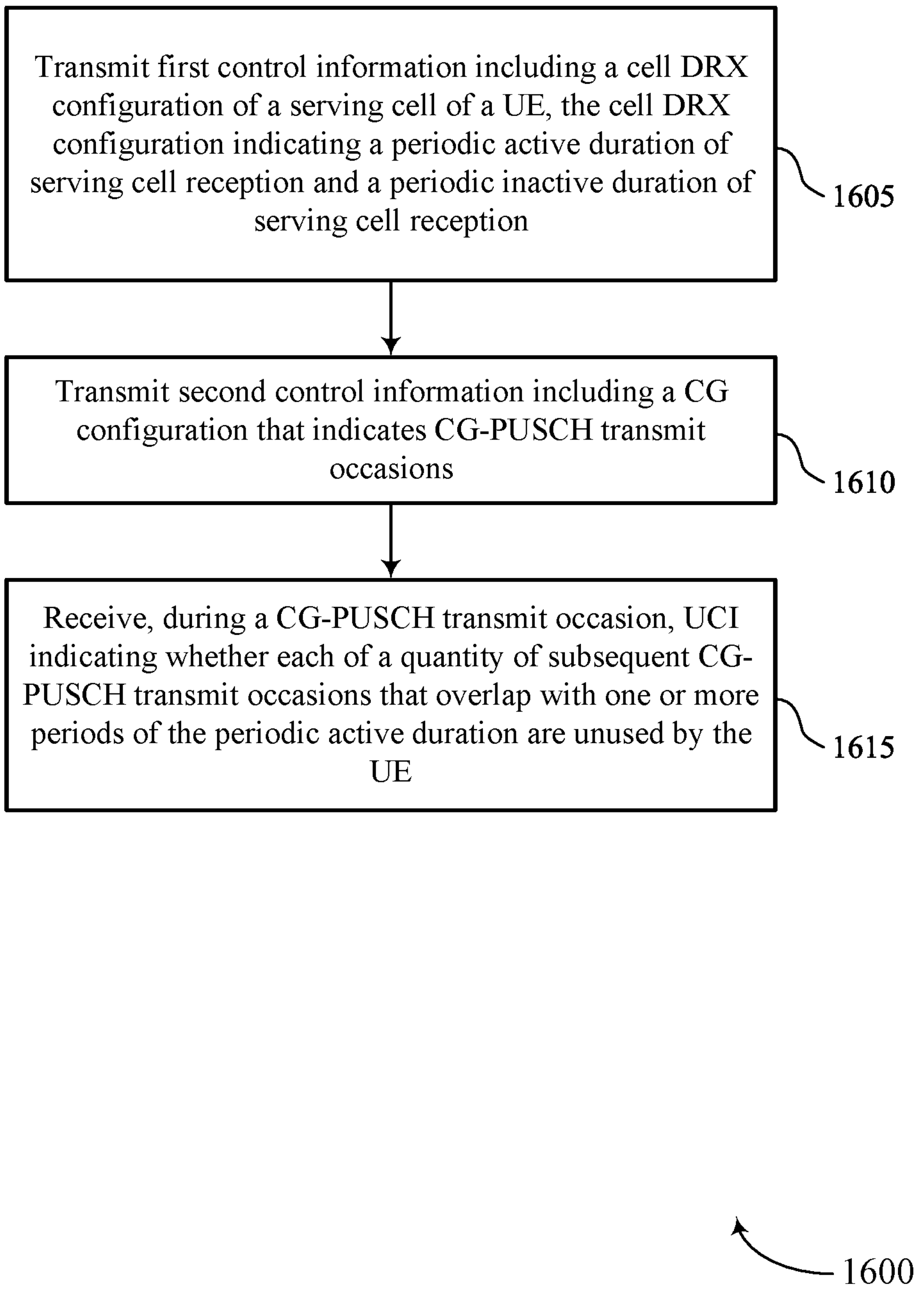

FIG. 16 shows a flowchart illustrating a method 1600 that supports uplink transmit occasion UCI for a cell discontinuous communication cycle in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting first control information including a cell DRX configuration of a serving cell of a UE, the cell DRX configuration indicating a periodic active duration of serving cell reception and a periodic inactive duration of serving cell reception. The operations of block 1605 may be performed in accordance with examples as disclosed herein. In some examples, aspects of the operations of 1605 may be performed by a DRX configuration component 1125 as described with reference to FIG. 11.

At 1610, the method may include transmitting second control information including a CG configuration that indicates CG-PUSCH transmit occasions. The operations of block 1610 may be performed in accordance with examples as disclosed herein. In some examples, aspects of the operations of 1610 may be performed by a CG-PUSCH configuration component 1130 as described with reference to FIG. 11.

At 1615, the method may include receiving, during a CG-PUSCH transmit occasion, UCI indicating whether each of a quantity of subsequent CG-PUSCH transmit occasions that overlap with one or more periods of the periodic active duration are unused by the UE. The operations of block 1615 may be performed in accordance with examples as disclosed herein. In some examples, aspects of the operations of 1615 may be performed by a UCI component 1135 as described with reference to FIG. 11.

Figure 17:
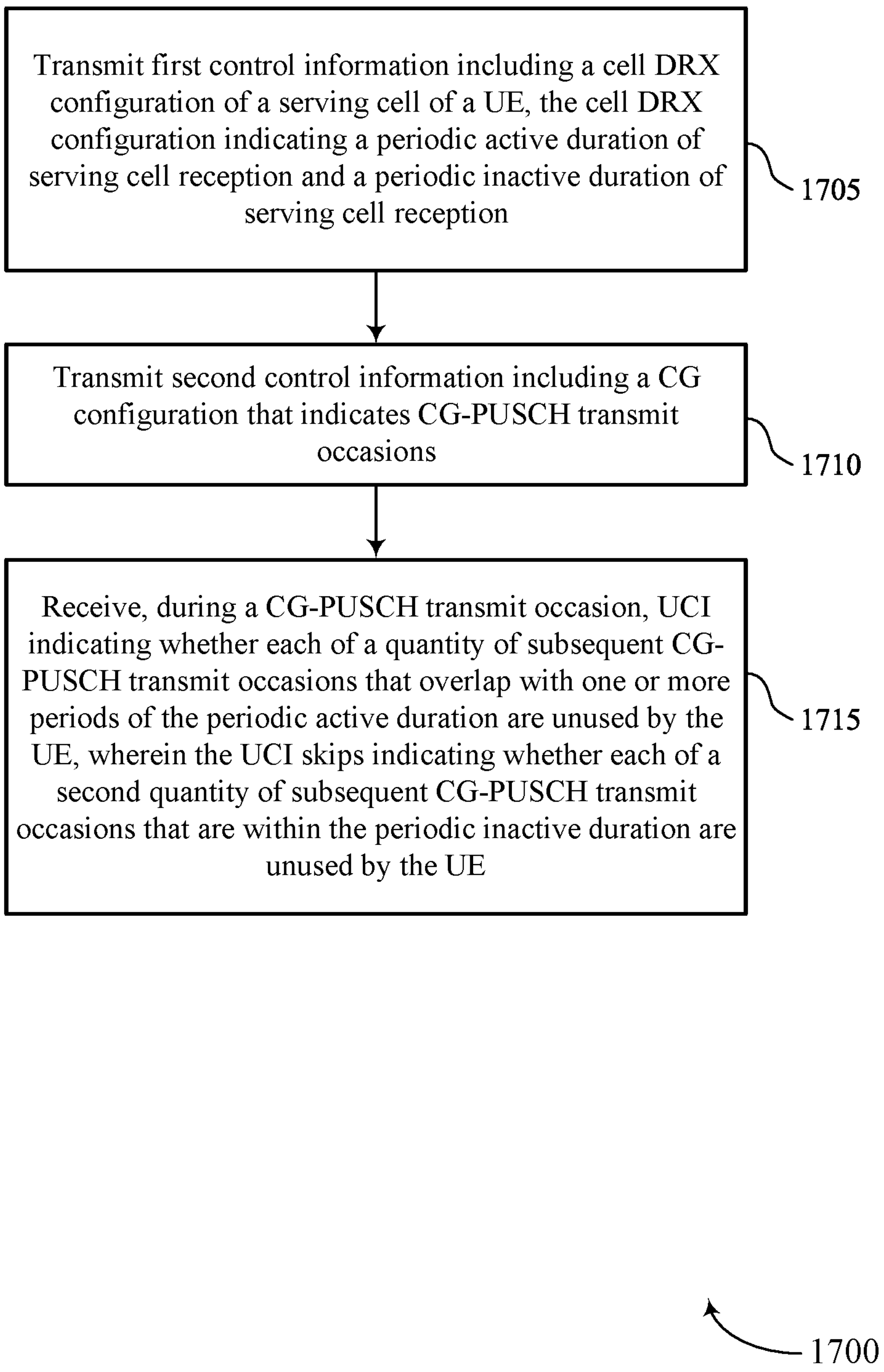

FIG. 17 shows a flowchart illustrating a method 1700 that supports uplink transmit occasion UCI for a cell discontinuous communication cycle in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting first control information including a cell DRX configuration of a serving cell of a UE, the cell DRX configuration indicating a periodic active duration of serving cell reception and a periodic inactive duration of serving cell reception. The operations of block 1705 may be performed in accordance with examples as disclosed herein. In some examples, aspects of the operations of 1705 may be performed by a DRX configuration component 1125 as described with reference to FIG. 11.

At 1710, the method may include transmitting second control information including a CG configuration that indicates CG-PUSCH transmit occasions. The operations of block 1710 may be performed in accordance with examples as disclosed herein. In some examples, aspects of the operations of 1710 may be performed by a CG-PUSCH configuration component 1130 as described with reference to FIG. 11.

At 1715, the method may include receiving, during a CG-PUSCH transmit occasion, UCI indicating whether each of a quantity of subsequent CG-PUSCH transmit occasions that overlap with one or more periods of the periodic active duration are unused by the UE, where the UCI skips indicating whether each of a second quantity of subsequent CG-PUSCH transmit occasions that are within the periodic inactive duration are unused by the UE. The operations of block 1715 may be performed in accordance with examples as disclosed herein. In some examples, aspects of the operations of 1715 may be performed by a UCI component 1135 as described with reference to FIG. 11.

The following provides an overview of aspects of the present disclosure:

Aspect 1: A method for wireless communications by a UE, comprising: receiving first control information comprising a cell DRX configuration of a serving cell of the UE, the cell DRX configuration indicating a periodic active duration of serving cell reception and a periodic inactive duration of the serving cell reception; receiving second control information comprising a CG configuration that indicates CG-PUSCH transmit occasions; and transmitting, during a CG-PUSCH transmit occasion, UCI indicating whether each of a quantity of subsequent CG-PUSCH transmit occasions of the CG-PUSCH transmit occasions that overlap with one or more periods of the periodic active duration are unused by the UE.

Aspect 2: The method of aspect 1, further comprising: transmitting, during one of the quantity of subsequent CG-PUSCH transmit occasions used by the UE, one or more uplink messages in accordance with the UCI.

Aspect 3: The method of any of aspects 1 through 2, wherein the UCI indicates whether subsequent valid CG-PUSCH transmit occasions are unused by the UE and skips indicating whether subsequent invalid CG-PUSCH transmit occasions are unused by the UE, a valid CG-PUSCH transmit occasion at least partially overlaps with the periodic active duration, an invalid CG-PUSCH transmit occasion is within the periodic inactive duration, and the quantity of subsequent CG-PUSCH transmit occasions are valid CG-PUSCH transmit occasions.

Aspect 4: The method of any of aspects 1 through 3, wherein the UCI skips indicating whether each of a second quantity of subsequent CG-PUSCH transmit occasions that are within the periodic inactive duration are unused by the UE.

Aspect 5: The method of any of aspects 1 through 4, wherein the quantity of subsequent CG-PUSCH transmit occasions overlap with multiple periods of the periodic active duration.

Aspect 6: The method of any of aspects 1 through 5, further comprising: receiving third control information that extends an active duration for a period of the periodic active duration, wherein one or more of the subsequent CG-PUSCH transmit occasions indicated by the UCI overlap with a portion of the active duration extended by the third control information.

Aspect 7: The method of aspect 6, wherein a quantity of bits of the UCI is increased relative to a configured window size associated with the UCI based at least in part on the third control information extending the active duration for the period of the periodic active duration.

Aspect 8: The method of any of aspects 1 through 7, further comprising: receiving third control information activating the cell DRX configuration of the serving cell, wherein one or more CG-PUSCH transmit occasions that are subsequent to the CG-PUSCH transmit occasion are excluded from the subsequent CG-PUSCH transmit occasions indicated by the UCI based at least in part on the one or more CG-PUSCH transmit occasions being within the periodic inactive duration of the activated cell DRX configuration.

Aspect 9: The method of any of aspects 1 through 8, further comprising: receiving third control information indicating a window size of the UCI, wherein the window size is applicable to CG-PUSCH transmit occasions that overlap with the periodic active duration and is inapplicable to CG-PUSCH transmit occasions that are within the periodic inactive duration.

Aspect 10: The method of any of aspects 1 through 9, wherein the subsequent CG-PUSCH transmit occasions comprise one or more non-consecutive CG-PUSCH transmit occasions in a time domain.

Aspect 11: The method of aspect 10, wherein the subsequent CG-PUSCH transmit occasions are consecutive in the time domain with respect to one or more periods of the periodic active duration.

Aspect 12: The method of any of aspects 1 through 11, wherein one or more of the CG-PUSCH transmit occasions overlap with the periodic inactive duration.

Aspect 13: A method for wireless communications by a network entity, comprising: transmitting first control information comprising a cell DRX configuration of a serving cell of a UE, the cell DRX configuration indicating a periodic active duration of serving cell reception and a periodic inactive duration of serving cell reception; transmitting second control information comprising a CG configuration that indicates CG-PUSCH transmit occasions; and receiving, during a CG-PUSCH transmit occasion, UCI indicating whether each of a quantity of subsequent CG-PUSCH transmit occasions that overlap with one or more periods of the periodic active duration are unused by the UE.

Aspect 14: The method of aspect 13, further comprising: receiving, during one of the quantity of subsequent CG-PUSCH transmit occasions used by the UE, one or more uplink messages in accordance with the UCI.

Aspect 15: The method of any of aspects 13 through 14, wherein the UCI indicates whether subsequent valid CG-PUSCH transmit occasions are used by the UE and skips indicating whether subsequent invalid CG-PUSCH transmit occasions are unused by the UE, a valid CG-PUSCH transmit occasion at least partially overlaps with the periodic active duration, an invalid CG-PUSCH transmit occasion is within the periodic inactive duration, and the quantity of subsequent CG-PUSCH transmit occasions are valid CG-PUSCH transmit occasions.

Aspect 16: The method of any of aspects 13 through 15, wherein the UCI skips indicating whether each of a second quantity of subsequent CG-PUSCH transmit occasions that are within the periodic inactive duration are unused by the UE.

Aspect 17: The method of any of aspects 13 through 16, wherein the quantity of subsequent CG-PUSCH transmit occasions overlap with multiple periods of the periodic active duration.

Aspect 18: The method of any of aspects 13 through 17, further comprising: transmitting third control information that extends an active duration for a period of the periodic active duration, wherein one or more of the subsequent CG-PUSCH transmit occasions indicated by the UCI overlap with a portion of the active duration extended by the third control information.

Aspect 19: The method of aspect 18, wherein the third control information indicates that a quantity of bits associated with a second UCI is greater than a quantity of bits associated with the UCI based in accordance with the third control information extending the active duration for the period of the periodic active duration.

Aspect 20: The method of any of aspects 13 through 19, further comprising: transmitting third control information activating the cell DRX configuration of the serving cell, wherein one or more CG-PUSCH transmit occasions that are subsequent to the CG-PUSCH transmit occasion are excluded from the subsequent CG-PUSCH transmit occasions indicated by the UCI based at least in part on the one or more CG-PUSCH transmit occasions being within the periodic inactive duration of the activated cell DRX configuration.

Aspect 21: The method of any of aspects 13 through 20, further comprising: transmitting third control information indicating a window size of the UCI, wherein the window size is applicable to CG-PUSCH transmit occasions that overlap with the periodic active duration and is inapplicable to CG-PUSCH transmit occasions that are within the periodic inactive duration.

Aspect 22: The method of any of aspects 13 through 21, wherein the subsequent CG-PUSCH transmit occasions comprise one or more non-consecutive CG-PUSCH transmit occasions in a time domain.

Aspect 23: The method of aspect 22, wherein the subsequent CG-PUSCH transmit occasions are consecutive in the time domain with respect to one or more periods of the periodic active duration.

Aspect 24: The method of any of aspects 13 through 23, wherein one or more of the CG-PUSCH transmit occasions overlap with the periodic inactive duration.

Aspect 25: An apparatus for wireless communications at a UE, comprising one or more processors, and instructions stored in one or more memories and executable by the one or more processors, individually or collectively, to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a network entity, comprising one or more processors, and instructions stored in one or more memories and executable by the one or more processors, individually or collectively, to cause the apparatus to perform a method of any of aspects 13 through 24.

Aspect 29: An apparatus for wireless communications at a network entity, comprising at least one means for performing a method of any of aspects 13 through 24.

Aspect 30: A non-transitory computer-readable medium storing code for wireless communications at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors; and instructions stored in one or more memories and executable by the one or more processors, individually or collectively, to cause the apparatus to:

receive first control information comprising a cell discontinuous reception configuration of a serving cell of the UE, the cell discontinuous reception configuration indicating a periodic active duration of serving cell reception and a periodic inactive duration of the serving cell reception;

receive second control information comprising a configured grant configuration that indicates configured grant physical uplink shared channel (PUSCH) transmit occasions; and transmit, during a configured grant PUSCH transmit occasion, uplink control information indicating whether each of a quantity of subsequent configured grant PUSCH transmit occasions of the configured grant PUSCH transmit occasions that overlap with one or more periods of the periodic active duration are unused by the UE.

2. The apparatus of claim 1, wherein the instructions are further executable by the one or more processors, individually or collectively, to cause the apparatus to:

transmit, during one of the quantity of subsequent configured grant PUSCH transmit occasions used by the UE, one or more uplink messages in accordance with the uplink control information.

3. The apparatus of claim 1, wherein:

the uplink control information indicates whether subsequent valid configured grant PUSCH transmit occasions are unused by the UE and skips indicating whether subsequent invalid configured grant PUSCH transmit occasions are unused by the UE, a valid configured grant PUSCH transmit occasion at least partially overlaps with the periodic active duration, an invalid configured grant PUSCH transmit occasion is within the periodic inactive duration, and the quantity of subsequent configured grant PUSCH transmit occasions are valid configured grant PUSCH transmit occasions.

4. The apparatus of claim 1, wherein the uplink control information skips indicating whether each of a second quantity of subsequent configured grant PUSCH transmit occasions that are within the periodic inactive duration are unused by the UE.

5. The apparatus of claim 1, wherein the quantity of subsequent configured grant PUSCH transmit occasions overlap with multiple periods of the periodic active duration.

6. The apparatus of claim 1, wherein the instructions are further executable by the one or more processors, individually or collectively, to cause the apparatus to:

receive third control information that extends an active duration for a period of the periodic active duration, wherein one or more of the subsequent configured grant PUSCH transmit occasions indicated by the uplink control information overlap with a portion of the active duration extended by the third control information.

7. The apparatus of claim 6, wherein a quantity of bits of the uplink control information is increased relative to a configured window size associated with the uplink control information based at least in part on the third control information extending the active duration for the period of the periodic active duration.

8. The apparatus of claim 1, wherein the instructions are further executable by the one or more processors, individually or collectively, to cause the apparatus to:

receive third control information activating the cell discontinuous reception configuration of the serving cell, wherein one or more configured grant PUSCH transmit occasions that are subsequent to the configured grant PUSCH transmit occasion are excluded from the subsequent configured grant PUSCH transmit occasions indicated by the uplink control information based at least in part on the one or more configured grant PUSCH transmit occasions being within the periodic inactive duration of the activated cell discontinuous reception configuration.

9. The apparatus of claim 1, wherein the instructions are further executable by the one or more processors, individually or collectively, to cause the apparatus to:

receive third control information indicating a window size of the uplink control information, wherein the window size is applicable to configured grant PUSCH transmit occasions that overlap with the periodic active duration and is inapplicable to configured grant PUSCH transmit occasions that are within the periodic inactive duration.

10. The apparatus of claim 1, wherein the subsequent configured grant PUSCH transmit occasions comprise one or more non-consecutive configured grant PUSCH transmit occasions in a time domain.

11. The apparatus of claim 10, wherein the subsequent configured grant PUSCH transmit occasions are consecutive in the time domain with respect to one or more periods of the periodic active duration.

12. The apparatus of claim 1, wherein one or more of the configured grant PUSCH transmit occasions overlap with the periodic inactive duration.

13. An apparatus for wireless communications at a network entity, comprising:

one or more processors; and instructions stored in one or more memories and executable by the one or more processors, individually or collectively, to cause the apparatus to:

transmit first control information comprising a cell discontinuous reception configuration of a serving cell of a UE, the cell discontinuous reception configuration indicating a periodic active duration of serving cell reception and a periodic inactive duration of serving cell reception;

transmit second control information comprising a configured grant configuration that indicates configured grant physical uplink shared channel (PUSCH) transmit occasions; and receive, during a configured grant PUSCH transmit occasion, uplink control information indicating whether each of a quantity of subsequent configured grant PUSCH transmit occasions that overlap with one or more periods of the periodic active duration are unused by the UE.

14. The apparatus of claim 13, wherein the instructions are further executable by the one or more processors, individually or collectively, to cause the apparatus to:

receive, during one of the quantity of subsequent configured grant PUSCH transmit occasions used by the UE, one or more uplink messages in accordance with the uplink control information.

15. The apparatus of claim 13, wherein:

the uplink control information indicates whether subsequent valid configured grant PUSCH transmit occasions are used by the UE and skips indicating whether subsequent invalid configured grant PUSCH transmit occasions are unused by the UE, a valid configured grant PUSCH transmit occasion at least partially overlaps with the periodic active duration, an invalid configured grant PUSCH transmit occasion is within the periodic inactive duration, and the quantity of subsequent configured grant PUSCH transmit occasions are valid configured grant PUSCH transmit occasions.

16. The apparatus of claim 13, wherein the uplink control information skips indicating whether each of a second quantity of subsequent configured grant PUSCH transmit occasions that are within the periodic inactive duration are unused by the UE.

17. The apparatus of claim 13, wherein the quantity of subsequent configured grant PUSCH transmit occasions overlap with multiple periods of the periodic active duration.

18. The apparatus of claim 13, wherein the instructions are further executable by the one or more processors, individually or collectively, to cause the apparatus to:

transmit third control information that extends an active duration for a period of the periodic active duration, wherein one or more of the subsequent configured grant PUSCH transmit occasions indicated by the uplink control information overlap with a portion of the active duration extended by the third control information.

19. The apparatus of claim 18, wherein the third control information indicates that a quantity of bits associated with a second uplink control information is greater than a quantity of bits associated with the uplink control information based in accordance with the third control information extending the active duration for the period of the periodic active duration.

20. The apparatus of claim 13, wherein the instructions are further executable by the one or more processors, individually or collectively, to cause the apparatus to:

transmit third control information activating the cell discontinuous reception configuration of the serving cell, wherein one or more configured grant PUSCH transmit occasions that are subsequent to the configured grant PUSCH transmit occasion are excluded from the subsequent configured grant PUSCH transmit occasions indicated by the uplink control information based at least in part on the one or more configured grant PUSCH transmit occasions being within the periodic inactive duration of the activated cell discontinuous reception configuration.

21. The apparatus of claim 13, wherein the instructions are further executable by the one or more processors, individually or collectively, to cause the apparatus to:

transmit third control information indicating a window size of the uplink control information, wherein the window size is applicable to configured grant PUSCH transmit occasions that overlap with the periodic active duration and is inapplicable to configured grant PUSCH transmit occasions that are within the periodic inactive duration.

22. The apparatus of claim 13, wherein the subsequent configured grant PUSCH transmit occasions comprise one or more non-consecutive configured grant PUSCH transmit occasions in a time domain.

23. The apparatus of claim 22, wherein the subsequent configured grant PUSCH transmit occasions are consecutive in the time domain with respect to one or more periods of the periodic active duration.

24. The apparatus of claim 13, wherein one or more of the configured grant PUSCH transmit occasions overlap with the periodic inactive duration.

25. A method for wireless communications by a user equipment (UE), comprising:

receiving first control information comprising a cell discontinuous reception configuration of a serving cell of the UE, the cell discontinuous reception configuration indicating a periodic active duration of serving cell reception and a periodic inactive duration of the serving cell reception;

receiving second control information comprising a configured grant configuration that indicates configured grant physical uplink shared channel (PUSCH) transmit occasions; and transmitting, during a configured grant PUSCH transmit occasion, uplink control information indicating whether each of a quantity of subsequent configured grant PUSCH transmit occasions of the configured grant PUSCH transmit occasions that overlap with one or more periods of the periodic active duration are unused by the UE.

26. The method of claim 25, further comprising:

transmitting, during one of the quantity of subsequent configured grant PUSCH transmit occasions used by the UE, one or more uplink messages in accordance with the uplink control information.

27. The method of claim 25, wherein:

the uplink control information indicates whether subsequent valid configured grant PUSCH transmit occasions are unused by the UE and skips indicating whether subsequent invalid configured grant PUSCH transmit occasions are unused by the UE, a valid configured grant PUSCH transmit occasion at least partially overlaps with the periodic active duration, an invalid configured grant PUSCH transmit occasion is within the periodic inactive duration, and the quantity of subsequent configured grant PUSCH transmit occasions are valid configured grant PUSCH transmit occasions.

28. A method for wireless communications by a network entity, comprising:

transmitting first control information comprising a cell discontinuous reception configuration of a serving cell of a UE, the cell discontinuous reception configuration indicating a periodic active duration of serving cell reception and a periodic inactive duration of serving cell reception;

transmitting second control information comprising a configured grant configuration that indicates configured grant physical uplink shared channel (PUSCH) transmit occasions; and receiving, during a configured grant PUSCH transmit occasion, uplink control information indicating whether each of a quantity of subsequent configured grant PUSCH transmit occasions that overlap with one or more periods of the periodic active duration are unused by the UE.

29. The method of claim 28, wherein the uplink control information skips indicating whether each of a second quantity of subsequent configured grant PUSCH transmit occasions that are within the periodic inactive duration are unused by the UE.

30. The method of claim 28, wherein the quantity of subsequent configured grant PUSCH transmit occasions overlap with multiple periods of the periodic active duration.

31. The apparatus of claim 1, wherein the uplink control information excludes one or more configured grant PUSCH transmit occasions that are invalid due to a collision of the one or more configured grant PUSCH transmit occasions either with one or more downlink symbols from a TDD uplink-downlink configuration or with one or more synchronization blocks.

32. The apparatus of claim 13, wherein the uplink control information excludes one or more configured grant PUSCH transmit occasions that are invalid due to a collision of the one or more configured grant PUSCH transmit occasions either with one or more downlink symbols from a TDD uplink-downlink configuration or with one or more synchronization blocks.

33. The method of claim 25, wherein the uplink control information excludes one or more configured grant PUSCH transmit occasions that are invalid due to a collision of the one or more configured grant PUSCH transmit occasions either with one or more downlink symbols from a TDD uplink-downlink configuration or with one or more synchronization blocks.

34. The method of claim 28, wherein the uplink control information excludes one or more configured grant PUSCH transmit occasions that are invalid due to a collision of the one or more configured grant PUSCH transmit occasions either with one or more downlink symbols from a TDD uplink-downlink configuration or with one or more synchronization blocks.

* * * * *